United States Patent
Wollaston et al.

[19]

[11] Patent Number: 6,061,506
[45] Date of Patent: May 9, 2000

[54] ADAPTIVE STRATEGY-BASED SYSTEM

[75] Inventors: Graham Wollaston, The Woodlands, Tex.; Ray Farmer, Knross, Australia

[73] Assignee: Omega Software Technologies, Inc., Houston, Tex.

[21] Appl. No.: 08/520,686

[22] Filed: Aug. 29, 1995

[51] Int. Cl.[7] .................................................. G06F 19/00
[52] U.S. Cl. ........................................... 395/500; 395/201
[58] Field of Search ........................... 395/500, 201–204, 395/207–211, 50, 60, 68, 76, 77; 364/578, 468.01–468.12

[56] References Cited

U.S. PATENT DOCUMENTS

| | | | |
|---|---|---|---|
| 5,148,370 | 9/1992 | Litt et al. | 364/468.1 |
| 5,195,172 | 3/1993 | Elad et al. | 395/50 |
| 5,446,891 | 8/1995 | Kaplan et al. | 395/615 |
| 5,481,647 | 1/1996 | Brody et al. | 395/76 |
| 5,517,405 | 5/1996 | McAndrew et al. | 395/50 |
| 5,557,514 | 9/1996 | Seare et al. | 395/202 |
| 5,615,112 | 3/1997 | Liu Sheng et al. | 395/615 |

*Primary Examiner*—Vincent N. Trans
*Attorney, Agent, or Firm*—Harrison & Egbert

[57] ABSTRACT

A user definable closed computerized smart system to emulate the day-to-day continuous operation of business environments with minimal human intervention. A simple and efficient mechanism for defining and updating recurring business cyclical activities is provided. A system is provided for tracking all predefined pending activities and events, storing and retrieving appropriate information in a relational knowledge base. A delay-pending feature is taught that modifies pending activities and events, relative chronologically to other business activities and events. An expert feature for effectuating certain predictable logical and intuitive behavior based upon rules stored in a knowledge base is also provided. An update fields methodology is also provided for maintaining and changing data in individual knowledge base records on the basis of dynamically changing circumstances.

12 Claims, 26 Drawing Sheets

| | |
|---|---|
| FIG. 8A |
| FIG. 8A |

Structure for table:      f: \omega\names.dbf
Number of data records:    186
Date of last update:       04/07/95
Memo file block size:      64
Code Page:                0

| Field | Field Name | Type | Width | Dec |
|---|---|---|---|---|
| 1 | NOTES | Memo | 10 | |
| 2 | PARENT | Logical | 1 | |
| 3 | PAR_NUM | Numeric | 6 | |
| 4 | RELATION | Character | 15 | |
| 5 | NUMBER | Numeric | 6 | |
| 6 | EMPLOYEE | Character | 3 | |
| 7 | SAL | Character | 11 | |
| 8 | FIRST | Character | 20 | |
| 9 | MI | Character | 2 | |
| 10 | LAST | Character | 30 | |
| 11 | DEAR | Character | 30 | |
| 12 | TITLE | Character | 40 | |
| 13 | COMPANY | Character | 60 | |
| 14 | ADDRESS1 | Character | 30 | |
| 15 | ADDRESS2 | Character | 30 | |
| 16 | CITY | Character | 30 | |
| 17 | STATE | Character | 12 | |
| 18 | ZIP | Character | 10 | |
| 19 | PHONE1 | Character | 15 | |
| 20 | PHONE2 | Character | 15 | |
| 21 | FAX | Character | 15 | |
| 22 | CONTACT2 | Character | 30 | |
| 23 | MEETING | Character | 30 | |
| 24 | LAST_CONT | Date | 8 | |
| 25 | LEAD_DATE | Date | 8 | |
| 26 | LEAD_FROM | Character | 25 | |
| 27 | STATUS | Character | 15 | |
| 28 | DATAC1 | Character | 40 | |
| 29 | DATAC2 | Character | 40 | |
| 30 | DATAC3 | Character | 40 | |
| 31 | DATAC4 | Character | 40 | |
| 32 | DATAC5 | Character | 40 | |
| 33 | DATAC6 | Character | 40 | |
| 34 | DATAC7 | Character | 40 | |
| 35 | DATAC8 | Character | 40 | |
| 36 | DATAD1 | Date | 8 | |
| 37 | DATAD2 | Date | 8 | |
| 38 | DATAD3 | Date | 8 | |
| 39 | DATAD4 | Date | 8 | |
| 40 | DATAD5 | Date | 8 | |
| 41 | DATAD6 | Date | 8 | |
| 42 | DATAD7 | Date | 8 | |
| 43 | DATAD8 | Date | 8 | |
| 44 | DATAN1 | Numeric | 10 | 2 |
| 45 | DATAN2 | Numeric | 10 | 2 |

FIG. 8B

| | | | | |
|---|---|---|---|---|
| 46 | DATAN3 | Numeric | 10 | 2 |
| 47 | DATAN4 | Numeric | 10 | 2 |
| 48 | DATAN5 | Numeric | 10 | 2 |
| 49 | DATAN6 | Numeric | 10 | 2 |
| 50 | DATAN7 | Numeric | 10 | 2 |
| 51 | DATAN8 | Numeric | 10 | 2 |
| 52 | DATAL1 | Logical | 1 | |
| 53 | DATAL2 | Logical | 1 | |
| 54 | DATAL3 | Logical | 1 | |
| 55 | DATAL4 | Logical | 1 | |
| 56 | DATAC10 | Character | 40 | |
| 57 | DATAC11 | Character | 40 | |
| 58 | DATAC12 | Character | 40 | |
| 59 | DATAC13 | Character | 40 | |
| 60 | DATAC14 | Character | 40 | |
| 61 | DATAC15 | Character | 40 | |
| 62 | DATAC16 | Character | 40 | |
| 63 | DATAC17 | Character | 40 | |
| 64 | DATAC18 | Character | 40 | |
| 65 | DATAC19 | Character | 40 | |
| 66 | DATAC20 | Character | 40 | |
| 67 | DATAC21 | Character | 40 | |
| 68 | DATAC22 | Character | 40 | |
| 69 | DATAC23 | Character | 40 | |
| 70 | DATAC24 | Character | 40 | |
| 71 | DATAC25 | Character | 40 | |
| 72 | DATAC26 | Character | 40 | |
| 73 | DATAC27 | Character | 40 | |
| 74 | DATAC28 | Character | 40 | |
| 75 | DATAC29 | Character | 40 | |
| ** Total ** | | | 1776 | |

FIG. 9

Structure for table:     f: \omega\employee.dbf
Number of data records:   3
Date of last update:     03/31/95
Memo file block size:    64
Code Page:     0

| Field | Field Name | Type | Width |
|---|---|---|---|
| 1 | EMP_ID | Character | 3 |
| 2 | EMP_FNAME | Character | 20 |
| 3 | EMP_MI | Character | 2 |
| 4 | EMP_LNAME | Character | 30 |
| 5 | EMP_TITLE | Character | 30 |
| 6 | EMP_GENDER | Character | 4 |
| 7 | ASSISTANT | Character | 30 |
| 8 | CLOSING | Character | 20 |
| 9 | EMP_PHONE | Character | 15 |
| 10 | EMP_EXT | Character | 4 |
| 11 | EMP_FAX | Character | 15 |
| 12 | MOBFONE | Character | 15 |
| 13 | EMP_MGR | Character | 30 |
| 14 | EMP_DIV | Character | 30 |
| 15 | PASSWORD | Character | 10 |
| 16 | SEC_LEVEL | Numeric | 1 |
| 17 | DEL_RTS | Logical | 1 |
| 18 | EDIT_RTS | Logical | 1 |
| 19 | ADD_RTS | Logical | 1 |
| 20 | BROW_RTS | Logical | 1 |
| ** Total ** | | | 264 |

FIG. 10

Structure for table:     f: \omega\actions.dbf
Number of data records:     185
Date of last update:     04/04/95
Code Page:     0

| Field | Field Name | Type | Width | Dec |
|---|---|---|---|---|
| 1 | ACT_NUM | Numeric | 3 | |
| 2 | ACT_DESC | Character | 30 | |
| 3 | ACT_FMT | Character | 8 | |
| 4 | ACT_TYPE | Numeric | 2 | |
| 5 | ACT_INIT | Logical | 1 | |
| 6 | NEXT_1 | Numeric | 3 | |
| 7 | DAYS_1 | Numeric | 3 | |
| 8 | NEXT_2 | Numeric | 3 | |
| 9 | DAYS_2 | Numeric | 3 | |
| 10 | NEXT_3 | Numeric | 3 | |
| 11 | DAYS_3 | Numeric | 3 | |
| 12 | REPL_1 | Numeric | 3 | |
| 13 | REPL_2 | Numeric | 3 | |
| 14 | REPL_3 | Numeric | 3 | |
| 15 | FROM_1 | Numeric | 3 | |
| 16 | FROM_2 | Numeric | 3 | |
| 17 | FROM_3 | Numeric | 3 | |
| 18 | MTD | Numeric | 4 | |
| 19 | YTD | Numeric | 6 | |
| 20 | COST | Numeric | 6 | 2 |
| 21 | TODO | Logical | 1 | |
| 22 | TRIMTEXT | Logical | 1 | |
| 23 | NOTELEN | Numeric | 4 | |
| ** Total ** | | | 103 | |

FIG. 11

Structure for table:    f: \omega\format.dbf
Number of data records:    10
Date of last update:    01/25/95
Code Page:    0

| Field | Field Name | Type | Width |
|---|---|---|---|
| 1 | FORMAT | Character | 8 |
| 2 | LETTERHEAD | Logical | 1 |
| 3 | ENVELOPE | Logical | 1 |
| 4 | PRINTABLE | Logical | 1 |
| 5 | PRINTLABEL | Logical | 1 |

Total     13

FIG. 12

Structure for table:    f: \omega\actypes.dbf
Number of data records:    5
Date of last update:    10/22/94
Code Page:    0

| Field | Field Name | Type | Width |
|---|---|---|---|
| 1 | ACT_TYPE | Numeric | 2 |
| 2 | TYPE_DESC | Character | 8 |

Total     11

FIG. 14

Structure for table:    f: \omega\pending.dbf
Number of data records:    547
Date of last update:    04/07/95
Code Page:    0

| Field | Field Name | Type | Width |
|---|---|---|---|
| 1 | PEND_DATE | Date | 8 |
| 2 | ACT_NUM | Numeric | 3 |
| 3 | ACT_DESC | Character | 30 |
| 4 | NUMBER | Numeric | 6 |
| 5 | PHONE | Logical | 1 |
| 6 | FONE_DONE | Logical | 1 |
| 7 | EMPLOYEE | Character | 3 |
| 8 | PROC_DATE | Date | 8 |
| ** Total ** | | | 61 |

FIG. 15

Structure for table:    f: \omega\history.dbf
Number of data records:    437
Date of last update:    04/04/95
Code Page:    0

| Field | Field Name | Type | Width |
|---|---|---|---|
| 1 | HIST_DATE | Date | 8 |
| 2 | ACT_NUM | Numeric | 3 |
| 3 | ACT_DESC | Character | 30 |
| 4 | NUMBER | Numeric | 6 |
| 5 | EMPLOYEE | Character | 3 |
| ** Total ** | | | 51 |

FIG. 16

Structure for table: f: \omega\update.dbf
Number of data records: 7
Date of last update: 03/08/95
Code Page: 0

| Field | Field Name | Type | Width | Dec |
|---|---|---|---|---|
| 1 | ACT_NUM | Numeric | 3 | |
| 2 | FLDNAME | Character | 10 | |
| 3 | CDATA | Character | 50 | 2 |
| 4 | NDATA | Numeric | 7 | |
| 5 | DDATA | Date | 8 | |
| 6 | LDATA | Logical | 1 | |
| 7 | DTYPE | Character | 1 | |
| 8 | ADDTO | Logical | 1 | |
| ** Total ** | | | 82 | |

FIG. 17

Structure for table: f: \omega\process.dbf
Number of data records: 220
Date of last update: 04/04/95
Code Page: 0

| Field | Field Name | Type | Width |
|---|---|---|---|
| 1 | NUMBER | Numeric | 6 |
| 2 | ACT_NUM | Numeric | 3 |
| 3 | ACT_FMT | Character | 8 |
| 4 | EMP_ID | Character | 3 |
| 5 | ZIP | Character | 10 |
| 6 | EMP_DIV | Character | 10 |
| 7 | TODO | Logical | 1 |
| 8 | PROC_DATE | Date | 8 |
| ** Total ** | | | 50 |

FIG. 21

Structure for table: f: \omega\expert.dbf
Number of data records: 1
Date of last update: 12/03/94
Code Page: 0

| Field | Field Name | Type | Width |
|---|---|---|---|
| 1 | CONDITION | Character | 250 |
| 2 | DOTHIS | Numeric | 6 |
| 3 | WHATITIS | Character | 20 |
| 4 | HOWOFTEN | Numeric | 4 |
| ** Total ** | | | 281 |

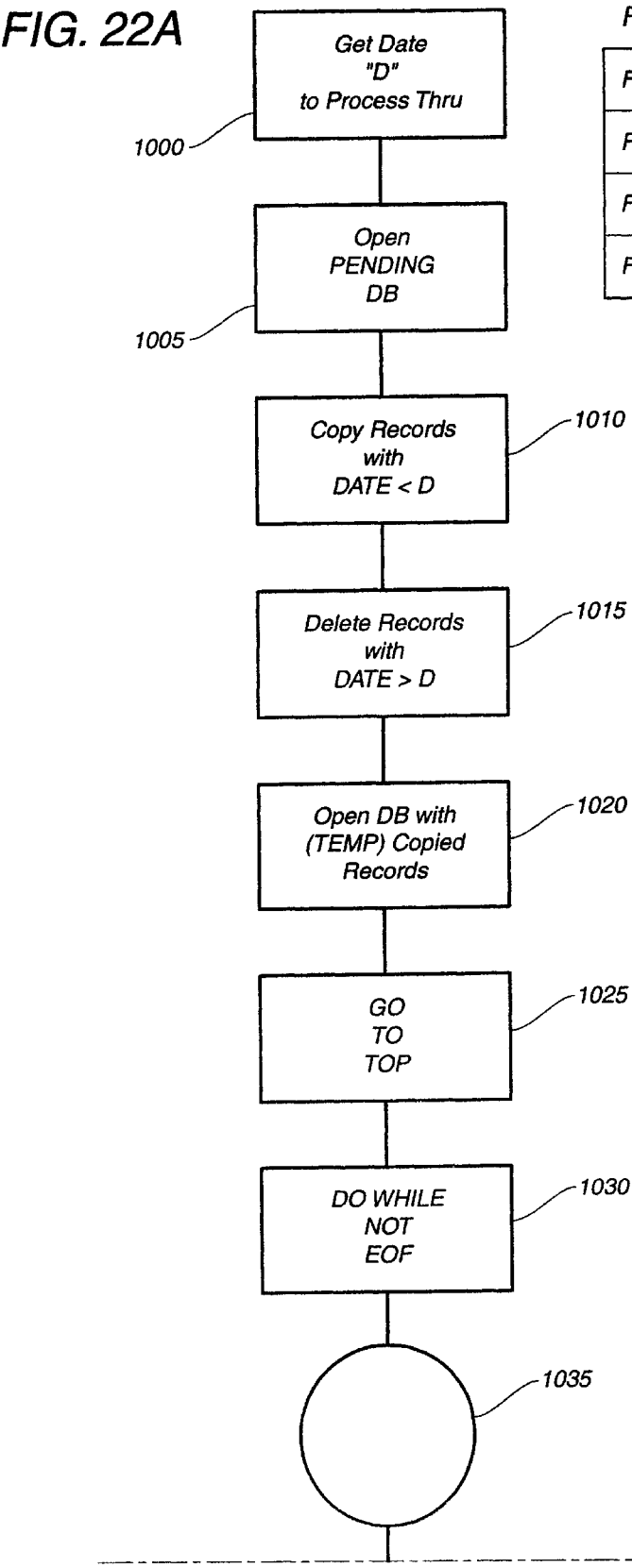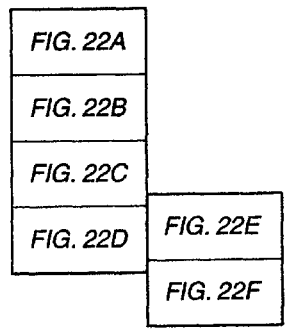

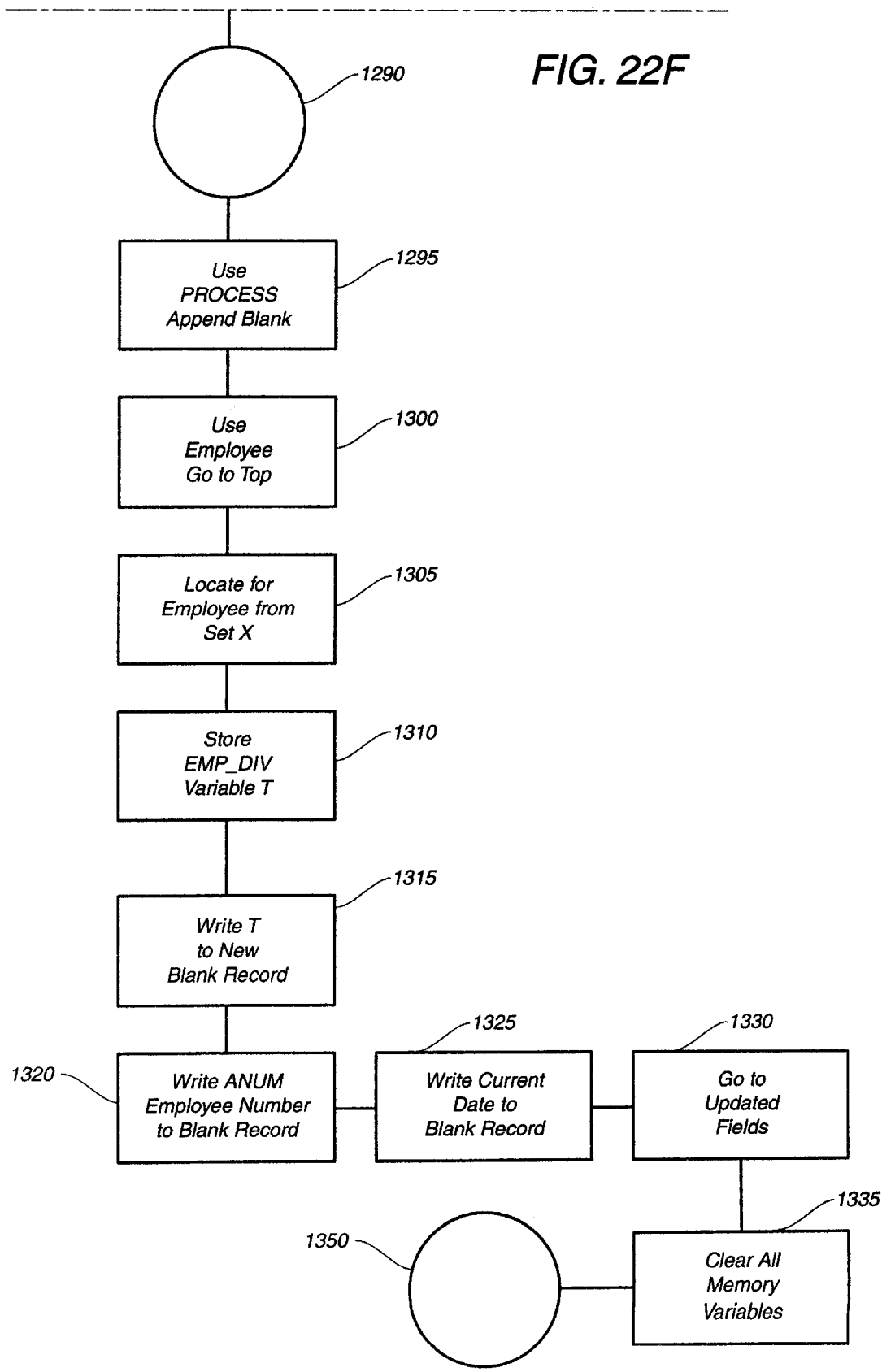

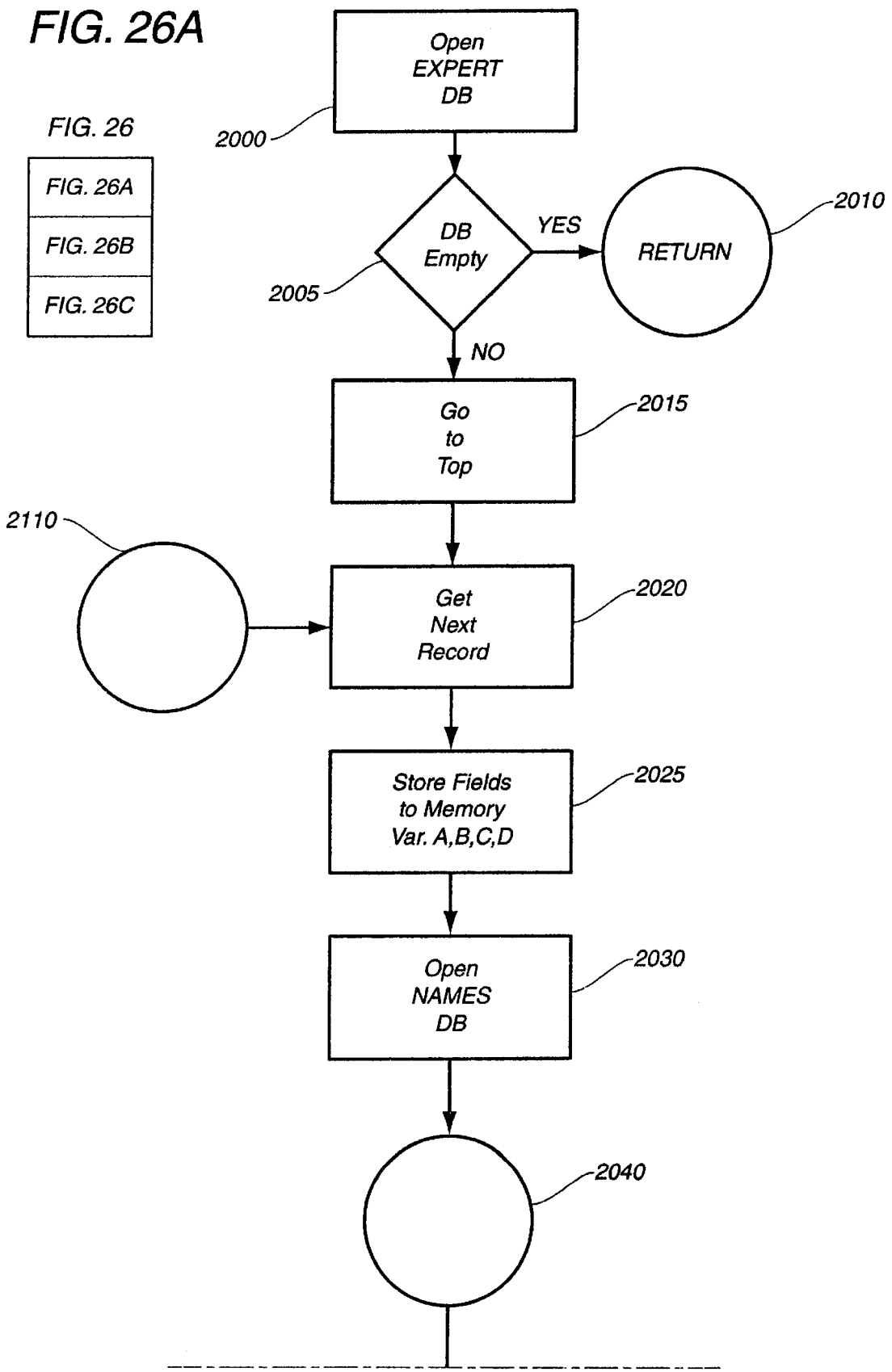

ADAPTIVE STRATEGY-BASED SYSTEM

BACKGROUND OF THE INVENTION

This invention relates to expert systems, and more particularly relates to strategy based systems which quiescently and continuously emulate the operation of business environments and the like on the basis of interrelated cumulative information stored in and accessed from an integrated "knowledge" database. This invention also relates to certain processes which allow stategy based systems to effectively and accurately emulate such real world business environments and the like.

As is well known by those skilled in the art, expert systems have been developed to apply inductive reasoning about problems in specific businesses and to generate solutions and explanations, based upon pertinent facts, heuristic rules, and an accumulation of observations, i.e., a knowledge base. Such prior art systems purport to encode the expertise of one or a plurality of human specialists to address typically a narrowly defined set of problems. Examples of such special purpose systems include the Prospector System intended for mineral exploration applications; Internist—1 intended for medical diagnosis applications; and GE's Delta/CATS—1 intended for locomotive maintenance applications. Thus, the Internist seeks to produce useful diagnostic output for medical professionals. Similarly, Delta/CATS seeks to generate a locomotive maintenance schedule to promote the purposes of users charged with the responsibility for the longevity and proper operation of locomotive engines.

As appreciated by those knowledgeable in the art, expert systems were among the first commercial applications of artificial intelligence technology. The early success of such expert systems led to the growth of a secondary market for expert system shells: tools that allow software developers to build knowledge bases and create expert systems from these tools for specific applications. It has become clear in the art, however, that development of expert systems even using shell-tools and the like have required considerable expertise on the part of software developers in order to produce a practical, working model.

Furthermore, it is typically the case that existing expert systems are virtually marketed exclusively to the artificial intelligence community due to the inherent complexity of these systems. These existing expert systems, viewed as development tools for complex applications—such as medical or mineral exploration and prospecting—rarely are marketed to end users. The customized expert systems which have been ultimately delivered to end users have proven to be costly because of high customization costs coupled with high costs for the development tools themselves.

While expert systems have also been developed for simpler applications, such rudimentary systems have merely conducted question and answer sessions with users. Based upon users' responses, these simple expert systems attempt to emulate human decision making and to provide suggestions for humans' current or future actions. As will be appreciated by those skilled in the art, the usefulness of these systems is limited to a narrow application primarily because of an inherently narrow field of expertise. Accordingly, these modest expert systems have essentially no value outside of their intended scope; such attempted application generally produces combinatorially explosive, and hence uncontrolled, unpredictable behavior. Unknown in the art are closed systems which can function effectively in a diversity of business environments, provided that operating and behavioral rules may be defined.

Regardless of the complexity and scope of expert systems known in the prior art, there is a clear reliance upon human intervention for all strategic instructions regarding what current or future actions should be taken by users. The panoply of anticipated actions and sequences of such actions are "programmed" by humans. As should be evident to those skilled in the art, such programming requires comprehension of the actions that constitute the processes that characterize a particular application and, of course, also requires comprehension of the interrelationships between these processes. Since all business activities inherently have repetitive cyclical processes, so long as human experts conversant with these processes and the constituent activities, and the interrelationships between these activities and processes, can completely define and effectively communicate them to computers, expert systems should theoretically be possible to implement But a disadvantage and limitation of expert systems known in the art has been the necessity for active and significant human intervention and decision-making feedback, even to the extent of requiring human interpretation of output.

On the other hand, a strategy based system allows for human decision-making and then relies upon a database of accumulated information or "knowledge" to ascertain what subsequent actions should be taken. The precursor of such a strategy based system has been expert systems which operate either automatically or semi-automatically using computer technology. As should be known to those skilled in the art, automatic processing has been used for several years, but hardware operation limitations and related computer programming limitations have prevented general application of expert systems due to such inherent problems as combinatorial explosion and the like. Thus, there appears to be no method or means in the art which provides a strategy based expert system which has the capability to routinely process the current and future actions of a business environment with minimal human intervention.

As should be appreciated by those skilled in the art, having expert systems with the ability to quantify what has otherwise been unquantifiable would provide computerized solutions (via "smart systems") for a plethora of business environments which support decision-making in a manner superior to traditional systems. Operating on conventional computers, such a smart system would be able to perform not only conventional number-crunching functions, but also to process non-numeric data such as actions which, indeed, permeate business activity.

As understood by those skilled in the art, expert systems strive to emulate the decision-making processes of humans who are aware of the various available choices to be made responding to a diversity of situations, or who require addition of other choices because of changing conditions. These decision-making processes are neither simple nor practicable by the addition of one more "rule" which may lead to a combinatorial explosion. For example, suppose that a particular process consists of three steps, with each step affording ten choices. As will be appreciated by those skilled in the art, adding one more choice at the first step, causes there to be 100 more possible outcomes of the process. Having the requisite decision-making performed by a human for what is typically a fundamental, recurring business function, vis a vis a more complex function like diagnosing ailments, and merely relying on a knowledge base to perform mundane but time-consuming ensuing activities, differentiates a strategy based system from an expert system.

The kind of choices that must be made by smart systems may be considered to be predefined "actions." While an action may take many forms, it is convenient to assume that a common action is an event. The event should, of course, relate to and be appropriate for a particular business scenario and the like. Thus, a series or sequence of events constitute the lowest common denominator which defines the activities of a particular business or organizational environment.

For instance, medical billing comprises a repetitive procedure that follows predetermined paths depending from the outcomes of a plurality of previous actions. At each decision point or cross-road in this procedure, a human must decide upon a course of action. Various mundane actions must be performed for humans to progress from one step to the next step in such a repetitive procedure. For example, secretaries are required to write letters that have probably been written many times before. As another example, workers make identical mistakes over and over again. As still other examples, lawyers inadvertently forget about case schedules; personnel change jobs and replacements must be trained; humans generally forget details. As should be appreciated by those skilled in the art, the more details that constitute a business process, the more likely that details will be forgotten; indeed, detailed processes are likely not to be performed at all because of typical compelling time and manpower constraints. Thus, virtually every commercial environment has a finite collection of processes which seem to never get performed.

Thus, it would be advantageous to have a closed computer system in which actions are sequentially processed on the basis of virtually nothing being designated as being insignificant. In such a smart system, inherently no data would be ignored and nothing would be forgotten. Such a system would consider all accumulated and current information throughout its processing, i.e., such a system would inherently have no data discrimination, but all accumulated knowledge would be utilized as a Gestalt to orchestrate activities and processes. If and whenever a rule of operation and the like were broken, a smart system would take appropriate action. Indeed, if deemed to be necessary to the business climate and the like, a smart system could even issue instructions to humans. Similarly, mundane activities would be performed flawlessly and with absolute attention to detail. An automated, computerized smart system, of course, does not become bored; it can be a strict disciplinarian by exception-reporting, wherein certain activities must be performed; or such a system can assume an advisory role providing for future activities and events.

The continuous operation of such a smart system would not require accurate quantitative data since numeric information is not the cornerstone thereof. Another important aspect of such a smart system would be to afford the capability to regularly track and monitor pending activities and events: each scheduled activity and each planned event should be thoroughly understood to the knowledge base relative to the operation of a business. To properly emulate a real world business environment, it would be preferable for such a knowledge base to capture the relationship of pending activities and events with all other attributes of the business, including employees, customers, and any and all other pertinent entities. Of course, in addition, once such pending activities and events are accomplished or otherwise resolved, a smart system should duly record the effectuated activities and events for historical purposes.

While there are scheduling systems and the like known in the art that display pending or impending events that are due to occur, and while there are also systems known that record events that have already occurred, there appears to be no strategy based system that allows users to define the plurality of pending and impending activities which are scheduled to occur by modeling individual business functions that constitute internal organizational work flows and predictable, consequent follow up activities. Furthermore, such prior art scheduling systems require that all pending activities be performed by humans. Smart systems, on the other hand, should not only allow scheduled activities to be performed automatically by computer, but also should, indeed, allow for automatic scheduling of predictable, consequent follow up activities.

Accordingly, these limitations and disadvantages of the prior art are overcome with the present invention, and improved means and techniques are provided which are useful for adaptively applying a dynamic user-defined knowledge base to routinely process the current and future activities and events to emulate a plethora of business environments with either minimal or no human intervention, and with the capability to deliver a user-definable computerized smart system.

SUMMARY OF THE INVENTION

The present invention provides a user definable closed computerized ("smart") system utilizing synergy between artificial intelligence and relational database technologies, wherein the operation of virtually any business environment and the like may be effectively emulated. More particularly, the present invention provides an automated computer system which continuously and quiescently operates user-defined business procedures and activities with minimal human intervention. As will be described in detail, the continual functioning of the present invention is enabled by novel application of a novel knowledge base which includes a mechanism for dynamically utilizing and updating comprehensive information about the operational aspects of business environments and the like.

The present invention recognizes that all businesses and organizations are operated by the performance of specific cyclical activities. By teaching a surprisingly simple, convenient and efficient mechanism for defining and updating these cyclical activities, the present invention emulates real world environments in a manner heretofore unknown in the art. As will be appreciated by those skilled in the art, the present invention brings the theoretical benefits afforded by expert systems down to the level of the ordinary computer user. The "expert" may now be literally anyone who knows how activities are initiated and how processes work—regardless of whether being complicated or simple—and anyone who knows what procedural options are available throughout.

A smart system contemplated under the present invention tracks all predefined pending activities and events, storing and retrieving appropriate information in a comprehensive set of related databases. As will be appreciated by those skilled in the art, a delay-pending feature is taught that modifies pending activities and events, relative chronologically to other business activities and events. The present invention provides an "Expert" feature for effectuating certain predictable logical and intuitive behavior based upon rules and the like stored in a knowledge base. Also provided is a unique Update Fields mechanism for maintaining and changing data in individual knowledge base records on the basis of dynamically changing circumstances, with such circumstances being anticipated and predefined within the knowledge base.

The present invention preferably provides a "look and feel" of traditional graphical user interface software to establish a suitable knowledge base from user input defining a particular business environment and then to operate the business according to the rules and behavior dictated by the knowledge base. These predefined rules and business behavior are incorporated into a knowledge base which uses novel parent-child methodology for interrelating records across its databases. As will be understood by those skilled in the art, the present invention, either through automatic operation or responding to user requests, performs output functions such as generating letters, sending faxes, issuing instructions, etc., which are required to continuously operate the business and the like. Beyond the output-oriented functioning of expert systems, however, the present invention actually emulates the ongoing behavior of business environments and the like.

It is an advantage and feature of embodiments of the present invention that all processes which may be executed automatically are so executed. It is a further advantage and feature of the present invention that all processes which require human intervention to properly trigger appropriate activities afford users the ability to interact in real time with the contemplated smart systems via a graphical user interface well known in the art. As will become clear to those skilled in the art, smart computer systems embodying the present invention utilize a synergy between artificial intelligence and relational database technologies hereinbefore unknown.

It is an object of the present invention to provide an improved expert system contemplated to be a smart system.

It is another object of the present invention to provide an automated, computerized smart system.

It is still another object of the present invention to provide a strategy based system having a reassignment capability responsive to changing responsibilities in business application environments.

It is another object of the present invention to provide a strategy based system having a delay-pending capability responsive to ongoing activities and processes in business application environments.

It is a further object of the present invention to provide a smart system which not only generates advantageous outputs, but also captures the innate behavior and concomitant actions of user-definable business environments and the like.

It is another object of the present invention to provide a smart system that allows certain activities to function as entry points to particular business environments wherein such entry activities are associated with corresponding sequences of predefined alternative consequent activities from which a user may select subsequent activities.

It is still another object of the present invention to provide a user-definable smart system affording an effective emulation of real world business systems and the like heretofore unknown in the art.

It is yet another object of the present invention to provide a user-definable smart system affording a novel methodology for identifying duplicate records in a demographic database.

It is still another object of the present invention to provide a user-definable smart system which reports the operational attributes of real world business systems and the like.

It is yet another object of the present invention to provide a user-definable smart system which tracks and reports the performance and activities of employees in business systems and the like.

It is another object of the present invention to provide a user-definable smart system which tracks and reports the service level provided to entities constituting business systems and the like.

It is another object of the present invention to provide a user-definable smart system which prevents the duplication of scheduled future activities and events.

It is another object of the present invention to provide a user-definable smart system which records costs associated with business and organizational activities.

It is another object of the present invention to provide a user-definable smart system which selectively displays only outcomes which are contextually possible at any decision junction emulating defined real world business systems and the like.

It is another object of the present invention to provide a user-definable smart system which allows for different employees to be engaged in multiple activities related to a particular business entity such as a customer and the like.

It is a specific object of the present invention to provide an adaptable user-defined strategy-based computerized system for emulating the continuous operation of a business scenario, said smart computer system comprising: a relational knowledge base means for storing a plurality of strategies pertaining to said business scenario, said knowledge base including names database means for storing a plurality of entities characterizing said business scenario; actions database means for storing a plurality of recurring activities and events characterizing said business scenario, and relating said plurality of entities; employee database means for storing a plurality of employees who perform said plurality of recurring activities and events upon said plurality of entities, said employee database means related to said names database means and said actions database means; pending database means for storing at least one sequence of select activities and events of said plurality of activities and events scheduled to be performed by corresponding select employees of said plurality of employees upon at least one select entity of said plurality of entities; and history database means for storing said select activities and events stored in said pending database means, when each of said activities and events of at least one sequence of said select activities and events stored in said pending database means is completed; input means for providing menus and screen dialogs for user specification of the contents of said knowledge base; means for ascertaining which of said plurality of activities and events scheduled to be performed by said plurality of employees upon said plurality of entities stored in said pending database means should be processed concomitantly with appropriate related databases in said knowledge base, to emulate the operation of said business scenario over a user specified time period; processing means for performing said processing of said pending database concomitantly with said appropriate related databases in said knowledge base over said user specified time period, and for maintaining synchronicity between completed actions contained in said pending database means and said history database means; query means for accessing said knowledge base; and output means for receiving results from said processing means and for providing said results to said plurality of employees. It is also a specific object of the present invention to provide such a computerized system with said relational knowledge base means further comprises update fields database means for automatic editing of records stored in said knowledge base means. It is another specific object of present invention to provide such computerized system with said processing means including employee reassignment means for dynamically replacing a plurality of employees from said employee database means assigned to perform a scheduled action upon a plurality of entities from said names database means contained in said pending database means with another plurality of employees from said employee database means. It is yet another specific object of the present invention to provide such computerized system with said names database means including parent-child means for interrelating a plurality of entities contained therein responsive to a variable number of user-defined interdependencies between said plurality of entities and a plurality of employees from said employees database means. It is another specific object of the present invention to provide such computerized system with said processing means including a delay pending means for selecting a plurality of said pending activities and events stored in said pending database means based upon user-defined selection criteria and then modifying the scheduled completion dates thereof based upon a user-defined date criterion, responsive to changes in said business scenario. It is yet another specific object of the present invention to provide said actions database means with entry point means for limiting selection of subsequent activities and events to a predefined subset of activities and events depending from an initial activity or event; with options from means for limiting selection of subsequent activities and events to a predefined subset of activities and events depending from a preceding activity or event; with replacement means for deleting a plurality of subsequent activities and events contained in said pending database means based upon said plurality of subsequent activities and events being predefined in a preceding activity or event, and said deletion of said plurality of subsequent activities and events occurring during said operation of said processing means.

These and other objects and features of the present invention will become apparent from the following detailed description, wherein reference is made to the figures in the accompanying drawings.

IN THE DRAWINGS

FIG. 8 depicts the record layout for the Names database depicted in FIG. 2.

FIG. 9 depicts the record layout for the Employee database depicted in FIG. 2.

FIG. 10 depicts the record layout for the Actions database depicted in FIG. 2.

FIG. 11 depicts the record layout for the Actions Format database incorporated into the preferred embodiment of the present invention depicted in FIG. 2.

FIG. 12 depicts the record layout for the Actions Type database incorporated into the preferred embodiment of the present invention depicted in FIG. 2.

FIG. 14 depicts the record layout for the Pending database depicted in FIG. 2.

FIG. 15 depicts the record layout for the History database depicted in FIG. 2.

FIG. 16 depicts the record layout for the Update database depicted in FIG. 2.

FIG. 17 depicts the record layout for the Process database depicted in FIG. 2.

FIG. 21 depicts the record layout for the Expert database depicted in FIG. 2.

FIGS. 22A–F depict portions of a flowchart of the Automatic Processing aspect.

Figure 23:
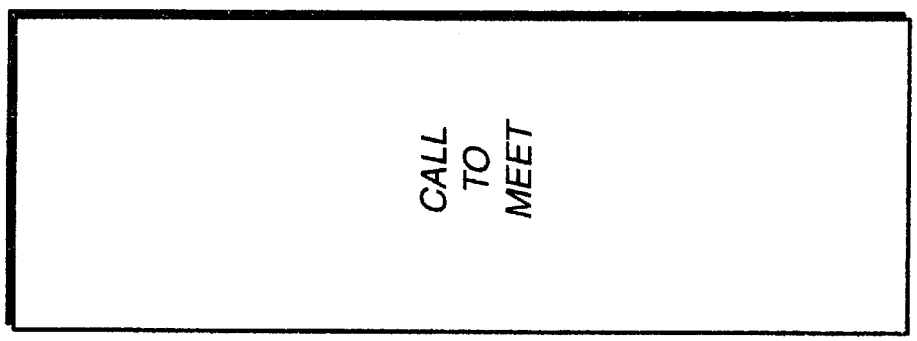

FIG. 23 depicts a sequence of sales-related actions emulated by the preferred embodiment.

Figure 24:
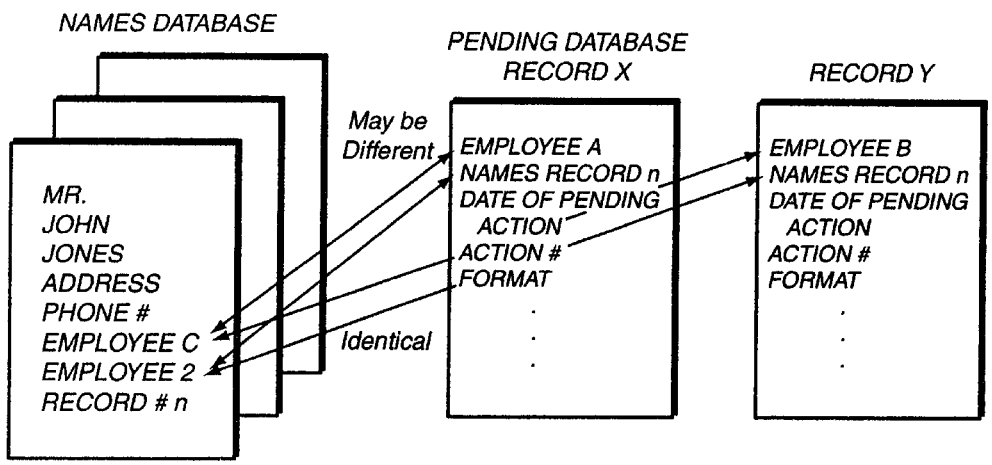

FIG. 24 is a schematic diagram depicting a one-to-many relationship between a Names database record and related Pending database records contained in the preferred embodiment.

Figure 25:
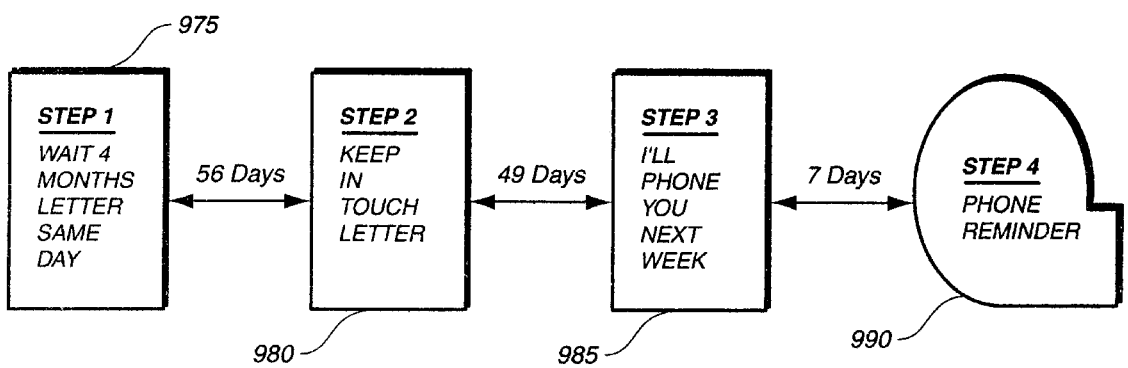

FIG. 25 depicts a block diagram of a portion of a sales-related strategy emulated by the preferred embodiment.

Figure 26B:
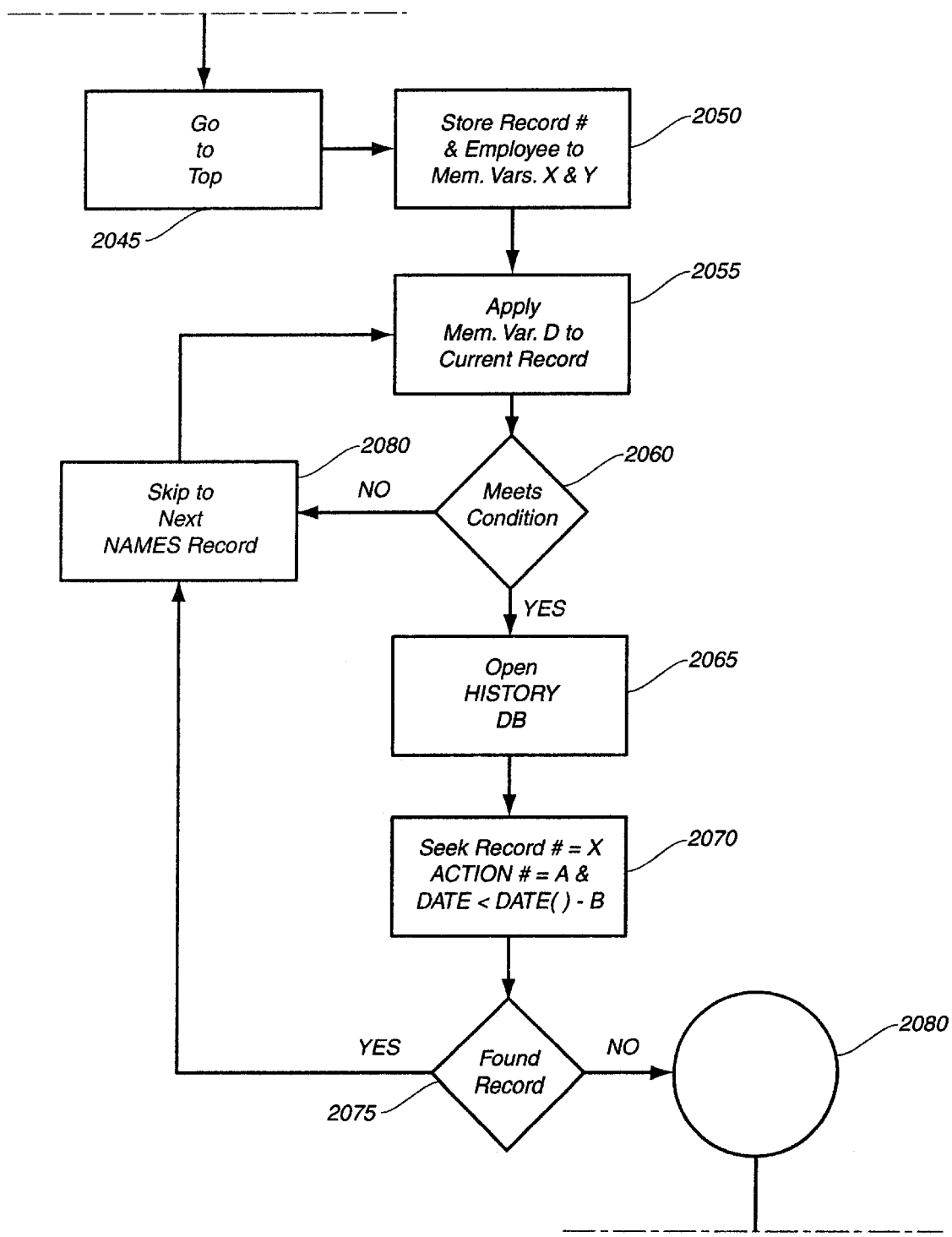
Figure 26C:
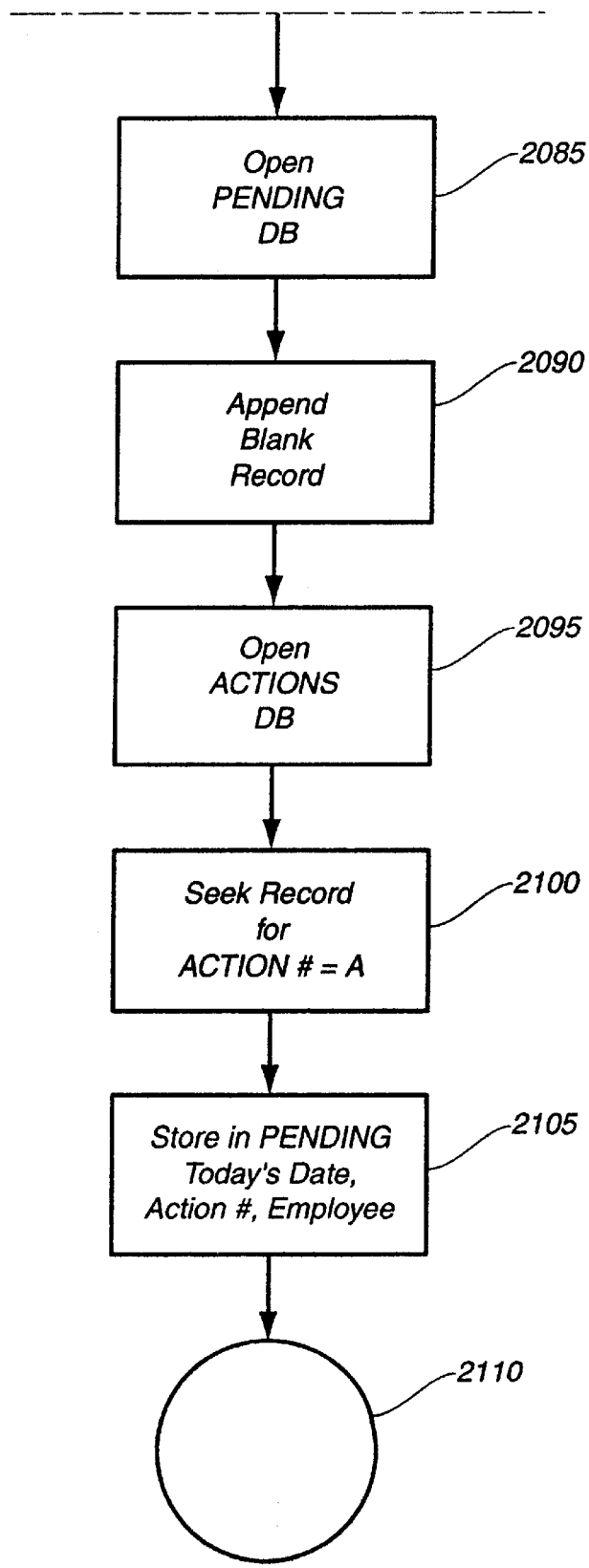

FIG. 26A–C depict a flowchart of the Expert aspect of the preferred embodiment.

DETAILED DESCRIPTION

A strategy based system contemplated by the present invention emulates the continuous operation of user defined business environments and the like. As will be hereinafter described in detail, the present invention enables users to define the behavior and processes constituting a particular business, storing relevant information in a novel knowledge base. Teaching a methodology for dealing with the plethora of regularly recurring activities and events that characterize every business environment and the like, the present invention essentially provides an adaptable engine for quiescently and continuously operating under such environments with minimal human intervention.

As will be appreciated by those skilled in the art, while characterized by regularly recurring activities and events, every business environment is also characterized by predictable deviations from normal operating conditions which must be accommodated to permit quiescent and continuous behavior. That is, as is frequently the case with expert systems known in the art, anomalous events and exceptions to expected behavior will occur. If such deviations from normal operating rules and the like are not anticipated and expeditiously remedied, then unpredictability and instability are likely to be consequences of such inadequately designed computer systems. As will be hereinafter described in detail, the present invention teaches a methodology which routinely integrates such anticipated anomalies and the like, wherein virtually any user-definable business environment may be conveniently and effectively operated with minimal human intervention.

For example, consider the scenario in which safety inspections must be made regularly for elevators in an office building. Such inspections may be required to be made in three-month cycles. For such inspection activity, there are predictable outcomes which may be defined. If the elevator routinely passes inspection, as usual, then the next scheduled activity would be to inspect again in three months. If, however, the elevator failed inspection, then the next scheduled activity would be to promptly repair and remedy the problem. In this repair cycle, there are several options for subsequent actions: either the problem is routinely remedied or there may be delay caused by unavailable parts, unavailable tools, or perhaps inadequate manpower. Associated with a passed inspection might be making an entry in the elevator log that the elevator is functioning properly. Associated with unavailable parts might be a repair cycle in which a requisition must be made, approval of the purchase and a purchase order generated. Once the needed part is received, then manpower would be allocated to the repair task and the appropriate tools would be sought to complete the repair. Of course, once the repair cycle is completed, then a normal inspection cycle might be reentered wherein a suitable entry is made in the elevator service log and the elevator returns to service. As will be described in detail, the present invention contemplates users defining such business-related cycles wherein the ongoing processes which characterize a business may be accurately emulated.

As another example of an embodiment of the present invention for emulating a business environment, consider a conventional car dealership. Suppose that a prospective customer reads a Yellow Pages advertisement and calls a car dealership. During the telephone conversation, a salesperson quotes a price for a particular car model. Based upon the salesperson's initial action with this unseen prospect, the salesperson has several possible follow-up or "next" actions. If the prospect agreed to a meeting date and time (on a different day), then the salesperson should confirm the meeting either by a follow-up phone call or a brief letter. If the prospect was uncomfortable with having a meeting with a salesperson after such a cold-call, then the salesperson may forward introductory information about the dealership; such an action should probably be followed with a phone call after a prescribed elapsed time. Similarly, for such an unconvinced prospect, it may be appropriate for the salesperson to forward information about pertinent cars; such an action should also probably be followed with a phone call after a prescribed elapsed time. It would be advantageous to have a way to remind the salesperson to make these follow-up calls.

As is typically the case in the art, if such a reminder function were left exclusively for a salesperson's individual tickler system and the like, then there it is likely that many of the follow-up calls will not be made, thereby leaving a possible sale to be dependent solely upon the prospect following through. If, however, such a reminder and the like were predefined to a smart system contemplated by the present invention as a next action, then salespersons would have their schedules sufficiently controlled or managed to rigorously make such follow-up calls to promote sales. As will also be apparent to those skilled in the art, managment preferably should receive reports of salespersons' activities to ascertain whether defined business strategies are being properly and timely effectuated. The present invention enables users at all levels of management to exploit a predefined knowledge base wherein real world performance may be effectively monitored, refined and optimized.

Continuing with this car dealership example, suppose that a prospect is shown a few cars by a salesperson and then decides to wait before buying a car. In a smart system contemplated by the present invention, users would preferably define wait cycles so that actions may be automatically or manually scheduled to be taken by salespersons at appropriate times. Thus, such wait cycles may include waiting two weeks, one month, two months, four months, etc., for next actions constituting subsequent prospect contacts, including follow-up notices and reminder letters issued to maintain lines of communication and to minimize the possibility of a prospect purchaseing a car at another dealership. Other possible outcomes under this scenario that might be defined as subsequent actions include "I'm too busy now"; "Company will not buy cars or trucks while this person authorizes purchases"; "Can't get through" in view of several unanswered phone message having been left, "Not interested in cars, only trucks"; "Only needs light pickup trucks, reassign account." Under the present invention, the more comprehensively such underlying outcomes and intertwined action cycles characterizing a business scenario are defined in a knowledge base, the more accurate will be the ensuing computerized emulation; likewise, by providing a complete knowledge base, users will enjoy an easy-to-use, automated smart system embodying the present invention, assuring that inherent business processes and events proceed according to known behavioral rules and patterns.

Figure 1:
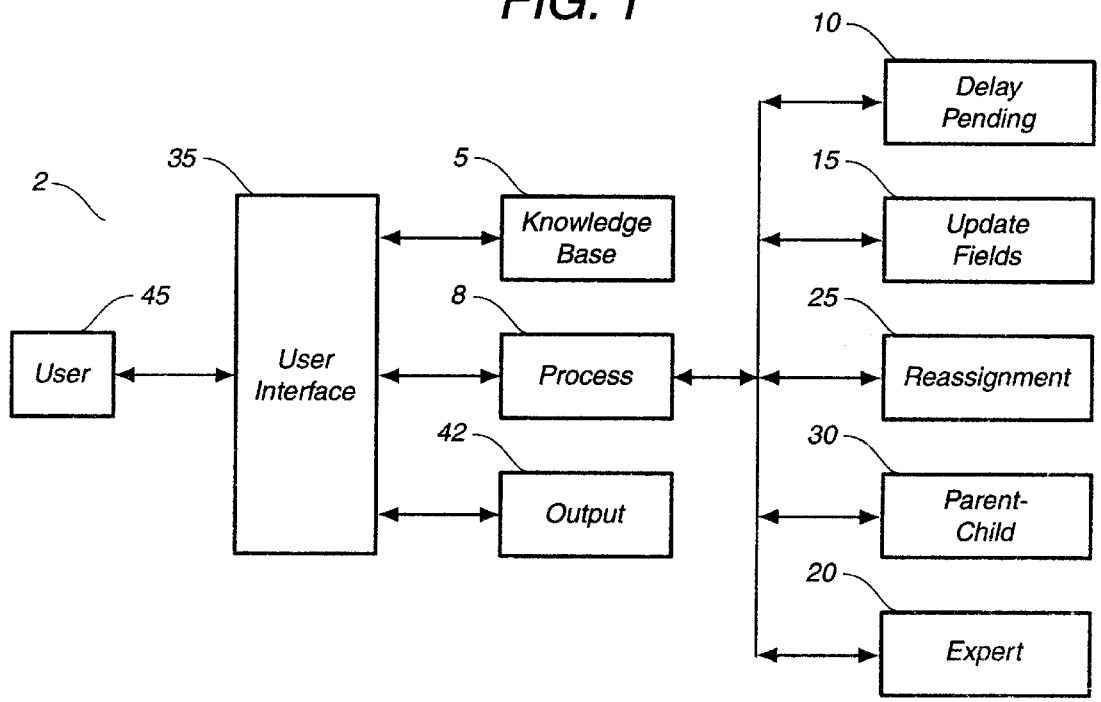
FIG. 1 depicts a block diagram of a smart system constituting the preferred embodiment of the present invention.

Referring now to FIG. 1, there is shown a block diagram depicting the components of preferred embodiment 2 of the present invention. More particularly, there is shown user 45 interacting with computerized smart system 2 through user interface 35. As will be hereinafter described in detail, user interface 35 delivers input from user 45 to knowledge base 5. The diversity of information stored in knowledge base 5 enables the structure and day-to-day operations of a business organization to be emulated and enables such comprehensive and timely business-related information to be instantaneously accessed by authorized personnel by computer system 40 comprising processing module 8 which may be invoked in either an automatic or a manual mode. As will be hereinafter described in detail, process module 8 includes novel delay-pending aspect 10, update-fields aspect 15, parent-child aspect 30, activity reassignment aspect 25 and the "expert" aspect 20. Results of such emulation by computer system 40 are presented to user 45 from output module 42 through user interface 35. Both the individual and synergistic operation of these various aspects of process feature 8 define and operate the various activities and events which characterize business environments and the like.

Figure 2:
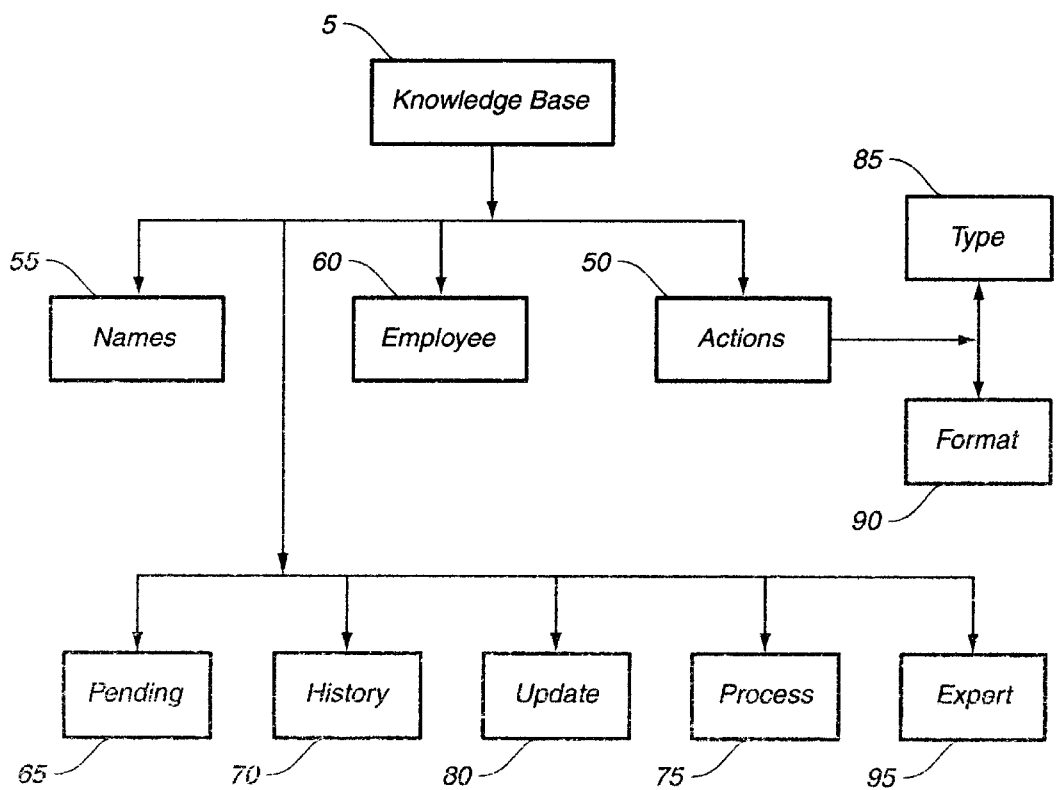
FIG. 2 depicts a simplified block diagram of a knowledge base comprising the preferred embodiment of the present invention.

Referring now to FIG. 2, there is depicted knowledge base 5 which provides accumulated information about a user-defined business environment for retrieval and exploitation by Delay-Pending aspect 10, Update-Fields aspect 15, Activity Reassignment aspect 25, Parent-Child aspect 30 and Expert aspect 20 of the present invention. More particularly, there is seen knowledge base 5 comprising Names database 55, Actions database 50, Employee database 60, Pending database 65, History database 70, Process database 75, and Update database 80. As will become evident to those skilled in the art, in the preferred embodiment, each of these interrelated databases comprises a conventional table storing relational information organized to accomplish the purposes of the present invention.

According to the teachings of the present invention, a strategy for a real world business scenario is constructed to emulate a plurality of interrelated activities and associated events. The lowest common denominator for each activity or event is defined to be a particular "action." A recurring sequence of these actions is defined to be a "cycle." A sequence of these cycles is defined to be a "series." A collection of series is defined to be a "strategy." Finally, an accumulation of strategies is defined to be a "knowledge base." Thus, FIG. 2 depicts a knowledge base preferably comprising related Names 55, Actions 50, Employee 60, Pending 65, History 70, Action-Format 90, Action-Type 85 and Process 75 database means.

According to the present invention, to define a particular business scenario, users should initially load a knowledge base with appropriate information about the entities to whom or for what actions will happen (Names database), the employees who are to perform these actions (Employee database) and the actions themselves that may be taken by employees upon named entities (Actions database). In a manner well known in the art, the preferred embodiment provides graphical screens to enable convenient entry of data into these databases by the users thereof, which, as will be clear to those skilled in the art, would typically be the employees and the like stored in the Employee database. For example, FIGS. 3–5 depict screens for receiving user input into the Names, Employee and Actions tables under Microsoft Windows.

Figure 3:
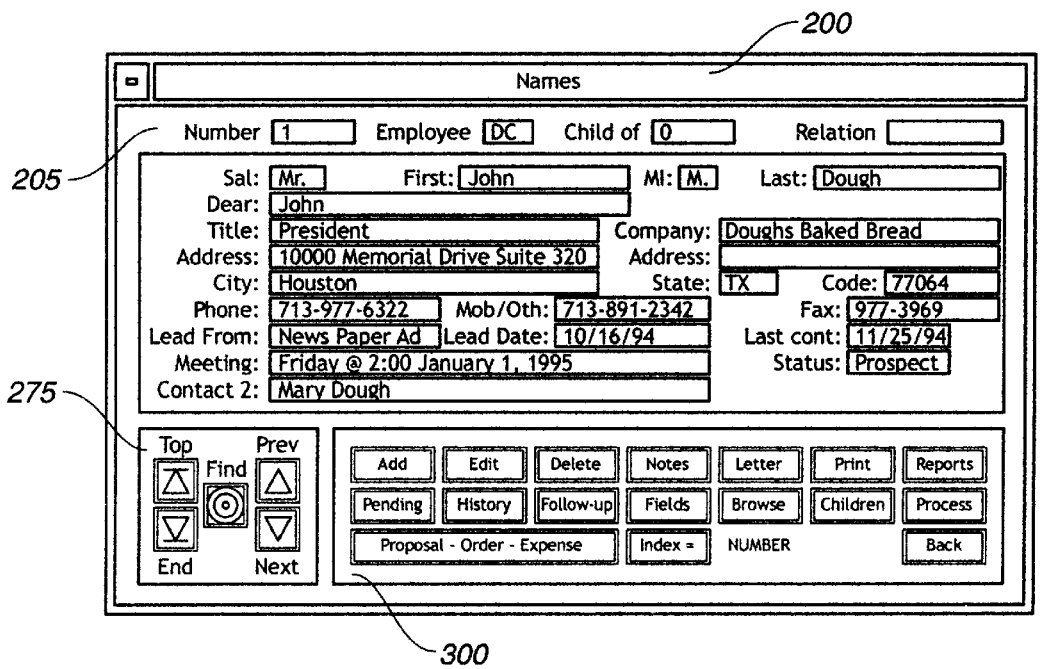
FIG. 3 depicts a data entry computer screen for receiving information into the Names database depicted in FIG. 2.

Referring specifically to FIG. 3, there is depicted an input screen for entering an entity into Names database 55. More particularly, there is shown Names data entry screen consisting of Names title bar 200, cross-reference region 205, information region 230, record movement region 275 and function invocation region 300.

Figure 4:
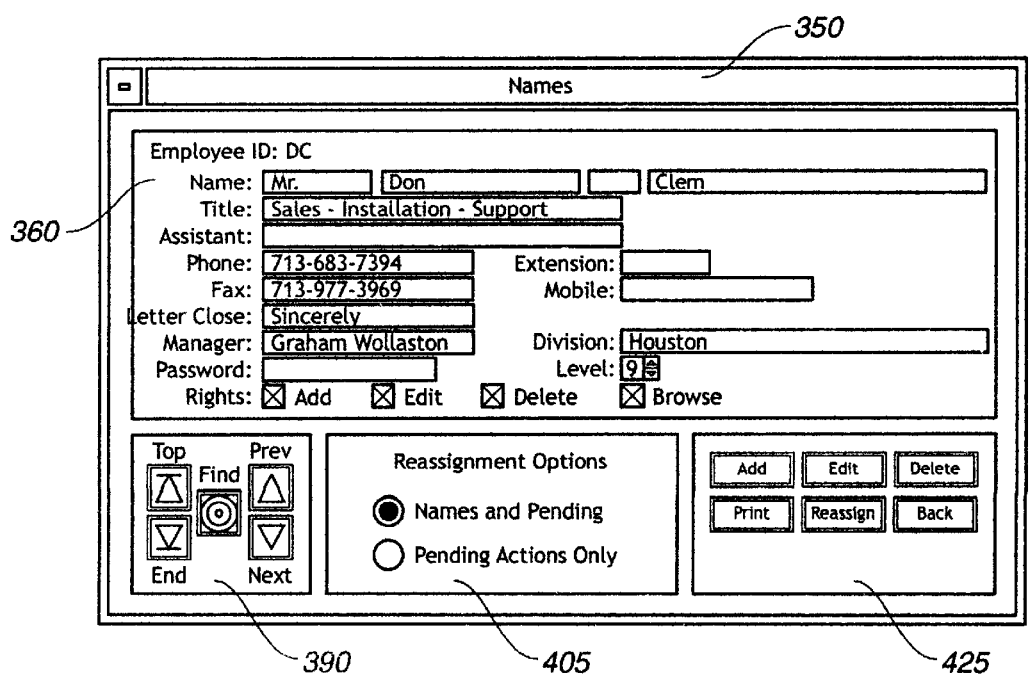
FIG. 4 depicts a data entry computer screen for receiving information into the Employee database depicted in FIG. 2.

Referring now specifically to FIG. 4, there is depicted an input screen for entering an employee or user into Employee database 60. More particularly, there is shown Employee data entry screen consisting of Employee and User title bar 350, information region 360, record movement region 390, reassignment options region 405 and function invocation region 425.

Figure 5:
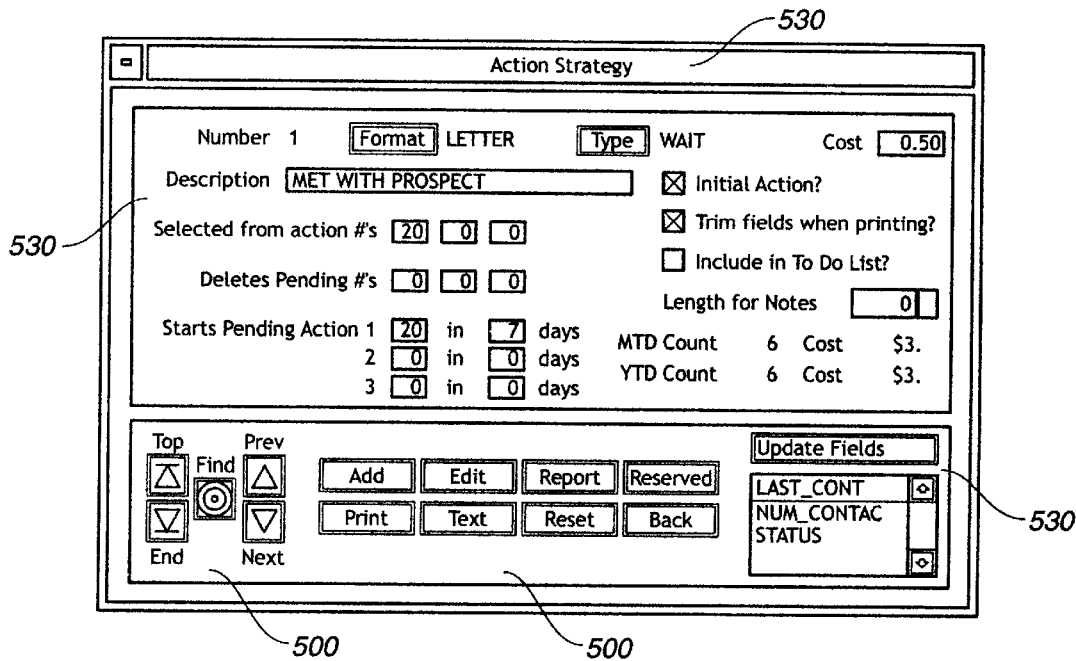
FIG. 5 depicts a data entry computer screen for receiving information into the Actions database depicted in FIG. 2.

Referring now specifically to FIG. 5, there is depicted an input screen for entering an action into the Actions database. More particularly, there is shown Actions data entry screen consisting of Action Strategy title bar 450, information region 455, record movement region 500, function invocation region 510 and update fields region 530.

Thus, a strategy based computer system contemplated by the present invention enables users to predefine all of the predictable possible responses from a plethora of anticipated human activities and related events, taking advantage of the hereinbefore described cyclical nature of most—if not all—business and organizational scenarios. As will become clear to those skilled in the art, these responses and follow-up activities and events are contained in a knowledge base for computer-driven exploitation at appropriate times in the real world scenario being emulated.

As an illustration of the modus operandi of the present invention, referring to FIG. 25, suppose that a salesperson engaging in a cold-call frequently receives the response: "Sounds great, but I really won't be in the market for at least four months from now." While the elapsed time specified by the prospective customer obviously will vary, assume for simplicity that four months is the standard time offset. Consider the following sequence of predefined next activities. A completed action for the salesperson may be described as "Wait for four months" which may be intertwined with a follow-up letter thanking the prospect for participating in the telephone conversation and advising the prospect that the salesperson will call again in 4 months (block 975). Thus, this wait action can predictably issue a confirming form letter which promptly requires the salesperson's signature prior to being forwarded to the prospect and also schedules a subsequent telephone call to be made four months thereafter. According to the present invention, this illustrative sales scenario could engender an action such as "Keep in touch" (block 980) scheduled nominally about two months, e.g., 56 days, after the cold call, comprising another form letter, but now stating "Just keeping my promise to stay in touch. If I can be of assistance at this time please call." or possibly stating "Just touching base. Please feel free to call me if now is a good time." Another scheduled action as part of this predictable sales cycle, could be, after nominally three months have elapsed, e.g., after another 49 days, a resume activity to essentially "wake up" or alert the prospect via a form letter (block 985) advising the prospect that "I was reviewing my files and remembered our recent conversation that you requested that I contact you in about four months. I'll call you next week." Then, a short time thereafter, e.g., 7 days later, another activity such as "Phone Reminders" could be scheduled (block 990) wherein the salesperson is prompted to make a follow-up telephone call to the prospect, who should be expecting the call. Thus, a smart system taught by the present invention, requires that a knowledge base be loaded with a panoply of human responses to real world events and situations, and follow-up activities and events, to emulate the ongoing operation of a particular business environment and the like. As will be understood by those skilled in the art, the cumulation of these actions and events comprise the strategy of the business environment and the like being emulated by the present invention.

As will be understood by those skilled in the art, by defining recurring sales-related activities and their interdependencies and possible outcomes, a smart computer system as taught by the present invention may automate many of the strategic decisions that must be made to effectively operate a business. From a sales management vantage point, manual and computer systems known in the art fail to provide comprehensive and timely information about a plurality of relevant issues, such as: Which prospects are due to be called? When are these prospects scheduled to be called? Which salespersons will call these prospects? What will happen after these calls to prospects are made? Which salespersons routinely follow-up effectively with prospects? Which salespersons routinely mishandle propsects? What actions are taken regarding prospects who have not been called as planned? Which salespersons are not observing established prospect protocol? The present invention provides a means and method for having such comprehensive and timely information virtually instantaneously available to help manage and operate a business and organization with minimal human intervention.

Figure 6:
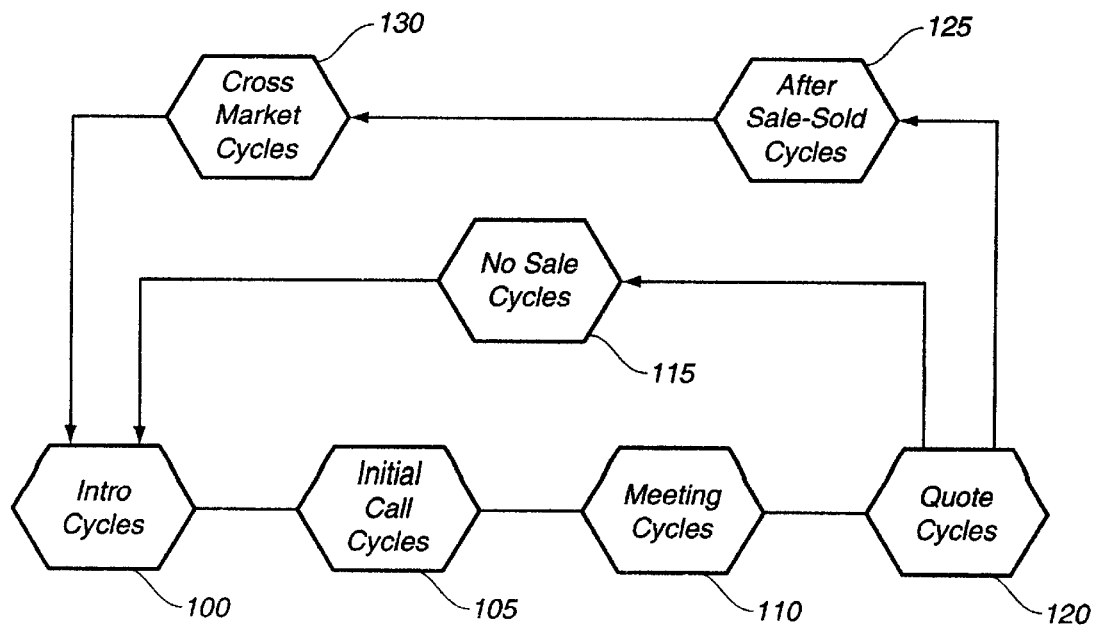
FIG. 6 depicts a flow diagram showing a global strategy representative of a conventional sales scenario.

Now referring to FIG. 6, there is shown a global strategy representative of a conventional sales scenario. In particular, the sales scenario commences with a plurality of introductory cycles 100 followed by a plurality of call cycles 105. Call cycles 105 are typically followed by a plurality of meeting cycles 110 which, from the salespersons' vantage point, are directed toward accomplishing a plurality of quote cycles 120. Quote cycles 120 either result in a plurality of no-sale cycles 115 or in a plurality of after-sale cycles 125 and possible cross-market cycles 130. Of course, as is evident to those skilled in the art, there are different sequencies of these cycles that may characterize a specific sales scenario. Nevertheless, the present invention teaches that so long as the series and sequences of cycles are defined for any business and organization environment, a smart system may be used to effectively and continuously emulate the environment with only minimal human intervention.

Figure 7:
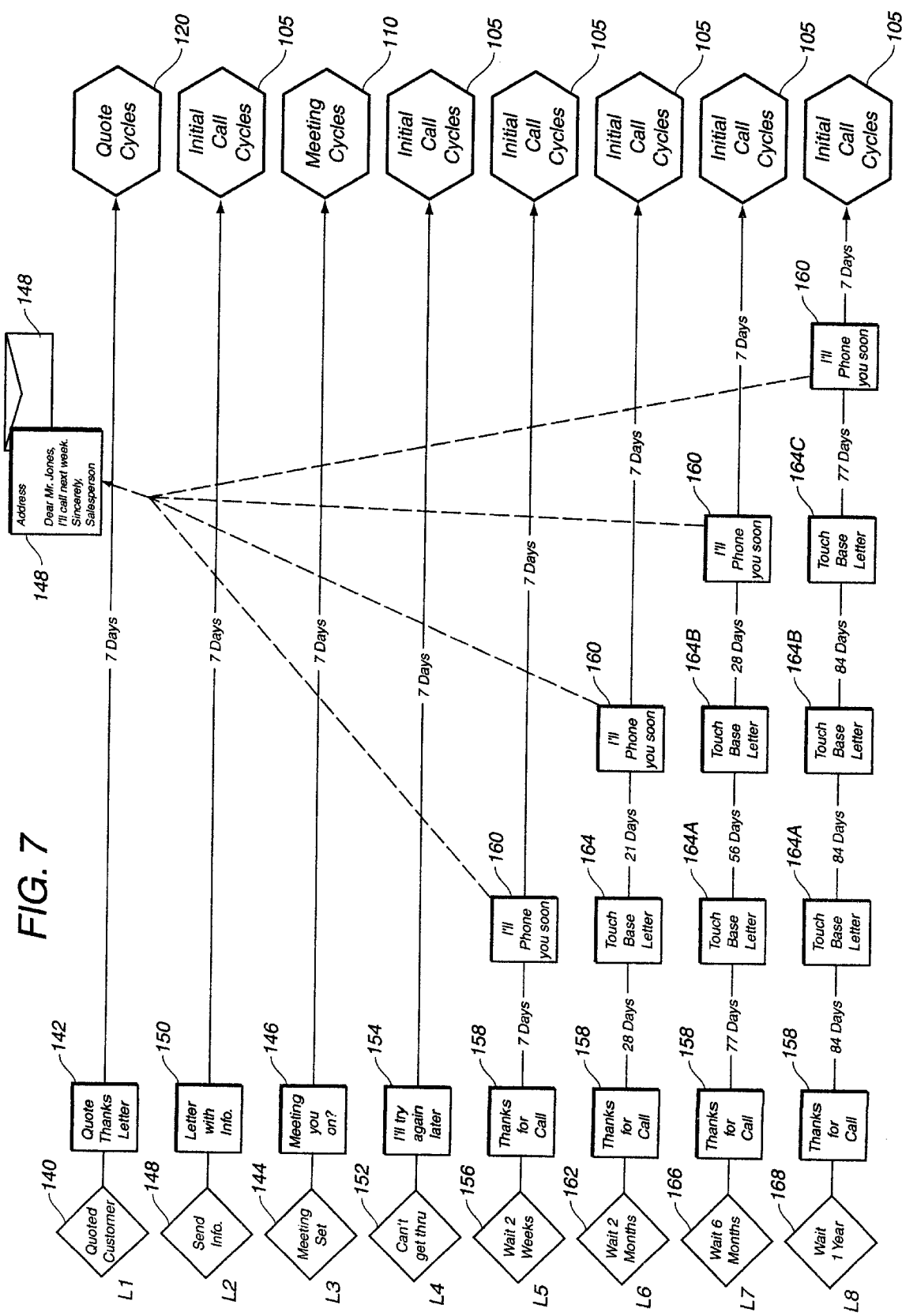
FIG. 7 depicts a schematic diagram showing a strategy-based approach to the sales scenario depicted in FIG. 6, taught by the present invention.

Referring now to FIG. 7, this strategy-based approach to a typical sales scenario is schematically illustrated. Each horizontal line represents a strategy corresponding to responses to human activity and follow-up activities and concomitant events that preferably should be performed. The first horizontal line L1 depicts conventional steps in Quote Cycles 120, wherein a prospective customer is presented with quote Quoted Customer 140 which is routinely followed by thank-you letter Quote Thanks Letter 142. As depicted in FIG. 7, seven days after this thank-you letter is sent to the prospect, Quote Cycles 120 is continued with appropriate action persuant to achieving a sale. Of course, the particulars of a sales environment being emulated by an embodiment of the present invention determines the elapsed time before the next action in Quote Cycle 120 is triggered. The third horizontal line L3 depicts conventional steps in Meeting Cycles 110, wherein a meeting has been set Meeting Set 144 with a customer on a specific date Meeting You On? 146. As will be appreciated by those skilled in the art, after a predefined period of time, e.g., seven days, an appropriate next action in Meeting Cycles 110 is triggered.

It will also be evident to those skilled in the art, that the remaining strategies depicted in FIG. 7 correspond to actions characterizing Initial Call Cycles 105, wherein a diversity of possible expectable outcomes from a salesperson's cold-call are predefined. For example, the second horizontal line 12 shows a situation wherein a prospect requests that information be sent Send Info. 148; an appropriate cover letter is sent to the prospect with the requested information is effectuated by the salesperson Letter with Info. 150 which then is followed by a predefined subsequent action in Initial Call Cycles 105, after a prescribed time has elapsed, e.g., seven days later. Similarly, the fourth horizontal line L4 represents an alternative outcome from a call to a prospective customer: the salesperson was unable to get through to the prospect Can't Get Thru 152. Obviously, the next defined action is to try again I'll Try Again Later 154 which is, in turn, followed by a predefined subsequent action in Initial Call Cycles 105 after a prescribed reasonable elapsed time, e.g., seven days.

The next horizontal line L5 shown in FIG. 7 corresponds to a situation in which a prospect requests that another call be made in about two weeks Wait 2 Weeks 156; this request is immediately followed by a call thank-you letter Thanks for Call 158, and, after a prescribed elapsed period of time, e.g., seven days, a letter advising the prospect of an impending call is sent I'll Phone You Soon 160 which is, in turn, followed by a predefined subsequent action in Initial Call Cycles 105 after a prescribed reasonable elapsed time, e.g., seven days. The next horizontal line L6 corresponds to a similar situation in which a prospect requests that another call be made in about two months instead of only in two weeks Wait 2 Months 162. Due to the longer elapsed time requested by the prospect before another call is made, as will be appreciated by those skilled in the art, it is advantageous to touch base Touch Base Letter 164 by letter in between sending a thank-you letter Thanks for Call 158 and sending a letter advising the prospect of an impending call I'll Phone You Soon 160.

As illustrated in FIG. 7, in this two-month follow-up situation, event Touch Base Letter 164 is scheduled to occur 28 days after activity Thanks for Call 158 and 21 days before activity I'll Phone You Soon 160 is scheduled to occur. As should be evident to those skilled in the art, once this subsequent call is made, an appropriate subsequent action is selected from Initial Call Cycles 105 after a prescribed reasonable elapsed time, e.g., seven days. Similarly, the next horizontal line L7 corresponds to a situation in which a prospect requests that another call be made in about six months instead of in two months Wait 6 Months 166. Due to the protracted elapsed time requested by the prospect before another call is made, it is advantageous to touch base twice Touch Base Letter 164A and B by letter in between sending thank-you letter Thanks for Call 158 and sending a letter advising the prospect of an impending call I'll Phone You Soon 160. As illustrated in FIG. 7, in this six-month follow-up situation, event Touch Base Letter 164A is scheduled to occur 77 days after event Thanks for Call 158 and next event Touch Base Letter 164B is scheduled to occur 56 days thereafter, corresponding to 28 days before activity I'll Phone You Soon 160 is scheduled to occur. As should be evident to those skilled in the art, once this subsequent call is made, an appropriate subsequent action is selected from Initial Call Cycles 105 after a prescribed reasonable elapsed time, e.g., seven days. Finally, the last horizontal line L8 corresponds to a situation in which a prospect requests that another call be made in about one year instead of in six months Wait 1 Year 168. Due to the protracted elapsed time requested by the prospect before another call is made, as will be appreciated by those skilled in the art, it is advantageous to touch base thrice Touch Base Letter 164A, B and C by letter in between sending a thank-you letter Thanks for Call 158 and sending a letter advising the prospect of an impending call I'll Phone You Soon 160. This one-year follow-up situation, Touch Base Letter 164A is scheduled to occur 84 days after event Thanks for Call 158, event Touch Base Letter 164B is scheduled to occur 84 days thereafter, and next event Touch Base Letter 164C is scheduled to occur 84 days after event Touch Base Letter 164B, corresponding to 77 days before activity I'll Phone You Soon 160 is scheduled to occur. Once this subsequent call is made, an appropriate subsequent action is selected from Initial Call Cycles 105 after a prescribed reasonable elapsed time, e.g., seven days.

Also schematically depicted in FIG. 7 is the automatic generation of representative letters and envelopes as follow up events to particular sales-related actions. Typical "I'll phone you soon" letter 180 is shown and accompanying envelope 185 or label 190 (not shown). Thus, on line L5, action 160 conventionally consists of sending a short letter advising a prospect that a phone call from the salesperson is imminent. Box 180 represents an appropriate letter for this purpose, which, under the present invention, is preferably automatically generated and is ready to be mailed to the prospect as soon as the salesperson's signature is affixed thereon. Of course, as will be appreciated by those skilled in the art, images of salespersons' signatures may be stored in a knowledge base contemplated by the present invention, thereby eliminating a human from this phase of the call cycle. It should also be evident that such a "I'll call you soon" communication 160 could be sent by facsimile transmission or electronic mail. As is also shown in FIG. 7, actions may be defined in a smart system to automatically generate an address on an envelope (box 180) or on a label (box 185). Similarly, for alternative lines L6, L7 and L8, impending call notice letter 160 would be generated automatically by the present invention, along with envelope 185 or label 190, as needed. Ergo, the knowledge base contemplated by the present invention enables the ongoing operation of virtually any business and organizational environment to be emulated. Furthermore, as will be understood by those skilled in the art, the present invention inherently encourages the routinization of recurring activities which may be folded into particular predefined cycles which, in turn, are automated to not only avoid human intervention, but also to minimize human error.

Thus, again referring to FIG. 7, it should be evident that automatically generated standard form letters, facsimiles, electronic mail etc., should preferably be defined in a smart system contemplated by the present invention to be associated with actions or events depicted by box 142 on line L1 corresponding to a "Quote thanks letter", box 150 on line L2 corresponding to a "Setter with information", box 146 on line L3 corresponding to a confining "Meeting you on ?" a particular date letter, box 154 on line L4 corresponding to a "I'll try again later" letter, box 158 on lines L5–L8 corresponding to a "Thanks for call" letter, box 160 on lines L5–L8 corresponding to a "I'll phone you soon" letter, box 164 (A, B, etc.) on lines L6–L8 corresponding to a "Touch base letter." Accordingly, in addition to minimizing mantime associated with recurring activities and events, which have been computerized for automatic generation, a smart system constructed and functioning according to the present invention prevents such recurring activities and events from being omitted—inadvertently or otherwise.

As hereinbefore described, the preferred embodiment of the present invention teaches a knowledge base comprising an interrelated set of database tables. Referring now to FIGS. 8–10, there are shown the record layouts showing field name, field type, and attributes (width and number of decimal places) for Names table 55, Employee table 60 and Actions table 50, respectively, comprising the preferred embodiment of the present invention. As shown in FIG. 8, each Names record is seen as consisting of 75 data fields. Memo field NOTES provides for a plurality of notes pertaining to the entity identified in the instant record. It is within the contemplation of the present invention that the note information may be automatically date-stamped or simply consist of notes not associated with any specific date.

Numeric field NUMBER stores the unique number for the record named in character fields FIRST, MI and LAST, storing first name, middle initial and last name, respectively. Field SAL stores the appropriate salutary address in letters for the named entity. The entity's business and related title are contained in character fields COMPANY and TITLE; character fields ADDRESS1, ADDRESS2, CITY, STATE and ZIP contain address information; fields PHONE1, PHONE2 and FAX contain telephonic information. Field CONTACT2 provides for specifying an alternate contact person at this named entity. Fields LEAD_FROM, LEAD_DATE, LAST_CONT, MEETING and STATUS provide a versatile method to completely identify the source and toning of prospective customer leads and the like, and for the status of the relationship between the primary employee stored in field EMPLOYEE with the named entity.

Logical field PARENT and character field RELATION provide a versatile method to hierarchically interrelate Names records, wherein the complete organizational relationship is defined. As will be appreciated by those skilled in the art, the combination of the PARENT and CHILD fields uniquely captures the totality of a broadly construed parent-child relationship between Names records. That is, fields PARENT and RELATION afford a novel way to interrelate records and groups of records, inherently defining the nature of any underlying relationships between entities. Thus, depending upon the business and/or organizational structure being defined, a plurality of such parent-child relationships may help accurately portray a real world scenario.

Logical field PARENT and numeric field PAR_NUM identify he parentage between Names records. If field PARENT contains a "1" corresponding to a true condition, then the record is a "parent" and has a plurality of "child" Names records. If field PAR_NUM contains a numeric value, then this identifies the number of the parent Names record for the current child record. Character field RELATION stores the nature of the relationship between parent and child records, e.g., golf buddy, co-workers, etc. As an example, suppose that Names record number 10 corresponding to entity Jill Sandusky frequently plays golf with Names record number 2500 corresponding to entity Barbara Kvorkean. Suppose further that Jill Sandusky is a "hot prospect" for employee ABC who loathes golf, but who is an excellent tennis player. Suppose sill further that named entity employee Barbara Kvorkean is an established customer of employee DEF. Pertinent fields for these related Names records might be depicted as follows:

| | | Names Database | | | |
|---|---|---|---|---|---|
| NUM-BER | PAR-ENT | PAR_NUM | RELATION | STATUS | EMPLOYEE |
| 10 | 0 | 2500 | golf buddy | hot prospect | ABC |
| 2500 | 1 | | | established customer | DEF |

The first entry shown in the Names table contains a "0" in field PARENT corresponding to a false condition; record 10 is not a parent as contemplated by the present invention. Since this record contains a number in field PAR_NUM, however, according to the present invention, it is a child record for the Names record indicated, i.e., for Names record 2500. For child record 10, field RELATION communicates the nature of the relationship between the parent and child records. The second entry in this Names table, contains a "1" in field PARENT corresponding to a true condition; record 2500 is a parent as contemplated by the present invention. There are, of course, several ways in which this relational information may be used. For instance, employee ABC may prevail upon employee DEF to encourage established customer Barbara Kvorkean to share her high regard for the company's products with her golf buddy, prospect Jill Sandusky. As another example, employees DEF and ABC might co-sponsor post-golf entertainment with Barbara Kvorkean and Jill Sandusky to cross-fertilize their respective interests. As anothe example, employee DEF may be secondarily assigned to prospective customer Jill Sandusky to function as a bridge between Barbara Kvorkean and employee ABC.

It is within the contemplation of the present invention that a Names record may be both a parent and a child. For example, consider another illustration in which a Names record is both a parent and a child.

| | | Names Database | | | |
|---|---|---|---|---|---|
| NUM-BER | PAR-ENT | PAR_NUM | RELATION | STATUS | EMPLOYEE |
| 10 | 0 | 2500 | golf buddy | hot prospect | ABC |
| 1853 | | | | new customer | ABC |
| 2500 | 1 | 1853 | St. Peters Church | established customer | DEF |

Now, record 2500 in the Names table contains a "1" in field PARENT and also contains a numeric value in field PAR_NUM, indicating that this record is both a parent and child. As should be evident to those skilled in the art, the number 1853 stored in field PAR_NUM of Names record 2500 specifies that Names record 1853 is the corresponding parent. Field RELATION conveys the nature of the parent-child relationship: that the entities represented by records 1853 and 2500 attend the same church.

As should be evident to those skilled in the art, the issue to be addressed by users of a smart system, is how to exploit this real world relational information to achieve a sale or the particular business goal being sought. The present invention contemplates a user-defined knowledge base which provides information as a Gestalt, wherein there is provided timely information about virtually every aspect of a business and organizational environment which may be accessed by employees and the like, according to predefined access and security rules, to accomplish the objectives and goals of the enterprise and the like.

While the preferred embodiment contains one PARENT_NUM field and one RELATION field, it should be clearly understood that it is within the contemplation of the present invention that there may be a plurality of these fields if prerequisite to accurately defining organizational and other parent-child relationships. It is also within the contemplation of the present invention that parent-child relationships may be defined not only among Names records and the like, but also may be defined between Names records and Employee records. Thus, information that relates propects and employees by common interests, religious leanings, neighborhood, etc., is now readily available throughout a business enterprise and the like to promote achieving goals and objectives. The present invention may, of course, include ancillary lookup tables for such fields as RELATION and STATUS to make data entry convenient for users, to minimize data errors, and to provide limited, predefined choices so that summary statistics and the like may be generated as required.

As will be appreciated by those skilled in the art, to enable a diversity of users of a smart system to completely identify entities in the Names table, the preferred embodiment provides 48 additional customizable fields. More particularly, there are 28 customizable 40-byte character fields (DATAC1, DATAC2, . . . DATAC8, DATAC10, . . . DATAC29), 8 numeric fields (DATAN1, DATAN2, . . . DATAN8), for storing up to 10 digits with 2 decimal places, and 4 logical fields (DATAL1, DATAL2, . . . DATAL4) for storing either a 1 for a "true" condition or a 0 for a "false" condition.

In a manner well known in the art, the present invention provides the capability to create look-up tables for a plurality of fields so that data entry burdens may be minimized and so that consistent values are assigned to key fields and other standardized names and the like.

In FIG. 9, each Employee record is shown consisting of 20 fields. Character field EMP_ID identifies an employee by his or her initials, which correspond to the first name, middle initials and last name stored in character fields EMP_FNAME, EMP_MI and EMP_LNAME, respectively. The employee's title and gender are stored in fields EMP_TITLE and EMP_GENDER, respectively. Character fields EMP_MGR and EMP_DIV define an employee's position in the business or organization via his or her manager and division or the like. Field ASSISTANT provides for supplemental secretarial or administrative support for the employee. Character fields EMP_PHONE and EMP_EXT store the employee's telephone number and extension, if any; fields EMP_FAX and MOBFONE store the facsimile number and Mobile phone numbers, respectively. Character field CLOSING contains the proper closing in letters sent to Names entities by the employee. As will become clear to those skilled in the art, while it is a feature and advantage of the present invention that employees have access to a comprehensive and cumulative knowledge for a predefined business environment and the like, this access may be controlled by invoking appropriate security-related fields. Thus, character field PASSWORD is provided for specifying a password and numeric field SEC_LEVEL is provided a suitable security level for the employee. Furthermore, logical fields DEL_RTS, EDIT_RTS, ADD_RTS and BROW_RTS indicate whether the employee defined in the instant Employee record has the rights to delete, edit, add and/or browse knowledge base records. It should be evident that by limiting a smart system to password access and by assigning an appropriate security level, the browsing rights of employees and other users may be conveniently controlled. Furthermore, the rights to edit, add or delete smart system records may be similarly controlled by a system administrator and the like.

In FIG. 10, each Actions record is shown consisting of 23 fields. Numeric field ACT_NUM contains a 3-digit number which identifies an action which is described in 30- byte character field ACT_DESC. Field ACT_FMT contains an 8-character indication of the "Format" of the action. As contemplated by the present invention, the Format of an action determines its associated output format. Predefined system Formats include Reminder, Phone, Suspend, Fax, Letter, Brochure, Failure, Delete, Visit and Null. An action having a Suspend Format, for example, is programmed to process the instant action and simultaneously to delete all other pending actions for a given Names record when the record is processed. A Fax Format, of course, preferably sends appropriate textual information pertaining to an action by facsimile transmission to an internal fax modem. As will be readily understood by those skilled in the art, the text for a Fax or a Letter Format would be conventionally prepared in the standard word processor used by employees, and then be available for routine incorporation into the appropriate output form, wherein the smart system merges all appropriate data from the Names, Employee and Actions databases. For example, in a Letter Format, employee information related to the action being performed upon a named entity would be merged to appear in the letter's signature block. Of course, the smart system automatically generates a suitable letter for the action being processed, corresponding to the employee who performed this action.

Actions like letters and reports may have Printable Formats, while other actions may be designated as having Non-Printable Formats, e.g., Phone actions. Under the preferred embodiment, a Null Format corresponds to an action for which nothing immediately happens, e.g., nothing is immediately printed; such a Null action is recorded in History database 70 and then a plurality of next actions is set up in Pending database 65. As will be evident to those skilled in the art, the present invention enables Formats to be added, edited and deleted in a conventional manner by editing tables and the like.

For convenient specification of the appropriate Format for an action, Format table 90 is preferably provided. FIG. 11 depicts the layout for records contained in the Format table. As clearly shown therein, as taught by the present invention, Formats focus upon outputs delivered to users. In particular, table Format contains 1-byte logical fields Letterhead, Envelope, Printable and Printlabel, corresponding to the necessity for including a letterhead, envelope or label, respectively, for a printable output. Hence, according to the preferred embodiment of the present invention, at printing time, as will be hereinafter described in detail, the print function opens Process database 75 and loads pertinent data therein for the selected format. As will become apparent to those skilled in the art, only actions which have Printable Formats (logical field Printable being "true") are displayed for output. Similarly, an Action record designating a Letter output (logical field Letterhead being "true") may also require an envelope Format (logical field Envelope being "true") or a label Format (logical field Printlabel being "true").

Of course, since the present invention teaches a user-defined smart system, users may create any reasonable Format for actions. For instance, if users (defined in the Employee database) regularly send Christmas cards to customers or potential customers (defined in the Names database), then a suitable Format would be Xmas. As will become clear to those skilled in the art, to generate Christmas cards to all employees' related records stored in the Names database, an action having a Format of Xmas would be added to each Names record as an appropriately scheduled action. Then, provided that certain selection criteria were met at processing time, each such action would be processed and set up for printing Christmas cards. If a label were to be printed in conjunction with each Christmas card, a user would indicate that Xmas is a printable format which requires that a label be generated at print time. Thus, the Format record for this new output format would be:

| Field | Value | Meaning |
| --- | --- | --- |
| Format | XMAS | Christmas cards |
| Letterhead | 0 | False; no letterhead |
| Envelope | 0 | False; no envelope |
| Printable | 1 | True; generate output |
| Printlabel | 1 | True; generate labels |

Referring again to the Actions table database depicted in FIG. 8, there is also seen numeric field ACT_TYPE which contains a 2-digit number identifying action type intended to permit generation of summary information. For example, action types might include Call, Meet, Sale, Consult and Wait. For convenient specification of the appropriate type for an action, ActTypes table 85 is preferably provided FIG. 12 depicts that each record contained in the ActTypes table has an 8-character description for each action type.

Logical field ACT_INIT indicates whether an action corresponds to an entry point to a knowledge base strategy. If an action corresponds to such an entry point, then there may be a sequence of related actions which predictably follow the initial action. Such anticipated next actions may be stored in a sequence of data fields in the Actions database record, effectively chained to the initial action. Thus, under the preferred embodiment, as depicted in FIG. 10, there are three next fields, i.e., NEXT_1, NEXT_2 and NEXT_3, which are time-sequenced relative to the initial action identified in field ACT_NUM and described in field ACT_DESC of the current Actions record. In particular, the next action contained in field NEXT_1 is scheduled to be the immediate next action after the elapsed time specified in field DAYS_1; the action after this immediate next action stored in field NEXT_2 is scheduled to occur within the elapsed time specified in field DAYS_2; similarly, the action after this next action stored in field NEXT_3 is scheduled to occur within the elapsed time specified in field DAYS_3. Hence, one pending action may establish multiple subsequent actions: once the instant pending action is completed, it is deleted from the Pending database, moved to the History database, and automatically establishes up to three (next) actions in the Pending database.

It should be clearly understood, of course, that embodiments of the present invention may comprise any number of such next-fields depending from the nature of the particular business environment and the like being emulated. It should also be understood that it is within the teachings of the present invention that the structure of these next-fields and related elapsed time fields may be configured according to well known database principles, wherein, for example, there may be a variable number of these next couplet fields—next action and corresponding elapsed time for such next action to occur—hierarchically related to the parent Actions record.

Still referring to FIG. 10, there is shown another sequence of fields which store the actions, if any, which are replaced by the instant action. More particularly, in the preferred embodiment, fields REPL_1, REPL_2 and REPL_3 store the action numbers for pending actions which are superseded by the action in the instant Actions record. Thus, each of fields REPL_1, REPL_2 and REPL_3 may store the number of a pending action which should be deleted from the Pending database because of the completion of the instant action. If, for example, an instant pending action is suspended, i.e., has a Suspend Format, then all actions contained in its REPL_1, 2 and 3 should likewise be deleted in the Pending database.

Under the teachings of the present invention, a user-defined strategy is captured in a computerized smart system wherein a single pending action may set up multiple subsequent actions. Similarly, such a single pending action may delete multiple pending actions. While the preferred embodiment is configured with three next-action fields (NEXT_1, NEXT_2 and NEXT_3) and three replace-action fields (REPL_1, REPL_2 and REPL_3), it should be clearly understood that it is within the teachings of the present invention that a plurality of these and related fields may be implemented.

Also shown in FIG. 10 is another sequence of fields which store possible actions which obtain or are options from the instant action. Such options-from fields, i.e., fields FROM_1, FROM_2 and FROM_3, store the action numbers for pending actions which are followed by the action in the instant Actions record. Thus, the present invention teaches a knowledge base which comprehensively communicates the path taken by a pending action identified in the current record, taken by or on behalf of a particular employee and performed on a named entity stored in the Names database.

Other fields contained in the Actions database as shown in FIG. 8 include COST which stores the cost associated with the action, MTD which stores the number of incidences of the action in the current month and YTD which stores the year-to-date incidences of the action. Field TODD is a logical field indicating whether the action should be printed on the employee's To Do List. Field TRIMTEXT is a logical field indicating whether the action should be printed with insignificant trailing blanks and the like "trimmed" or truncated; as should be appreciated by those skilled in the art, such trimming is advantageous when the content of fields result from merged database fields. Field NOTELEN specifies the numerical value for employee generated notes to be included when printing reminders or actions (with associated notes) included on To Do Lists, etc.

As will be appreciated by those skilled in the art, effective use of telephone activities is an important facet of operating a successful business. Accordingly, the present invention provides a telephone processing aspect intended to automatically assure optimum telephone behavior by smart system users. As will be understood by those skilled in the art, the automatic processing aspect of the present invention focuses upon an appropriate date through which calls should be processed. Under automatic processing contemplated by the present invention, all pending actions including telephone actions would be processed through a specified date, e.g., current date; all such processed pending actions are removed from the Pending database and stored in the History database. Some of the telephone actions scheduled to be made on or before the specified date, however, may be deleted from the Pending database before the calls are actually made. To avoid phone calls being deleted prematurely from the database of pending actions, the present invention provides a telephone processing aspect that assures that pending calls are not deleted until actually performed.

The preferred embodiment isolates all such scheduled pending calls by isolating all pending actions having a Format preferrably beginning with the character string "PHONE." Such an action having a PHONE Format has a corresponding record established in the History database, has a next action established in the Pending database—as defined in the Actions database—but this phone action is not deleted from the Pending database. As will be understood by those skilled in the art, this telephone methodology allows an entity having an existing Phone Type action to remain in the Pending database until an employee actually makes the call. Then, and only then, is the Phone action deleted from the Pending database. Notwithstanding the use of computer-generated voice messages and the like, it should be evident that Phone Type actions are usually actions performed by humans. Thus, the present invention teaches a methodology capable of deleting pending actions that have been performed or that are due to be performed and also capable of holding in abeyance actions that were due to be performed but were not completed. The relationship between records stored in either the Pending or History databases, or both, indicates whether actions have been completed, whether telephone actions have been scheduled for completion but are still pending, etc.

To illustrate the unique operational aspects and concomitant benefits of a strategy based system contemplated by the present invention, a common sales scenario will again be considered. In so doing, focus will be made upon a fundamental activity and its correspondence to an actual real world event. It is assumed that a salesperson is due to place a telephone call to a prospective customer who has inquired about a product that the salesperson sells. It is further assumed that the salesperson's immediate objective is to achieve a face to face meeting with this prospective customer (the prospect).

Figure 13:
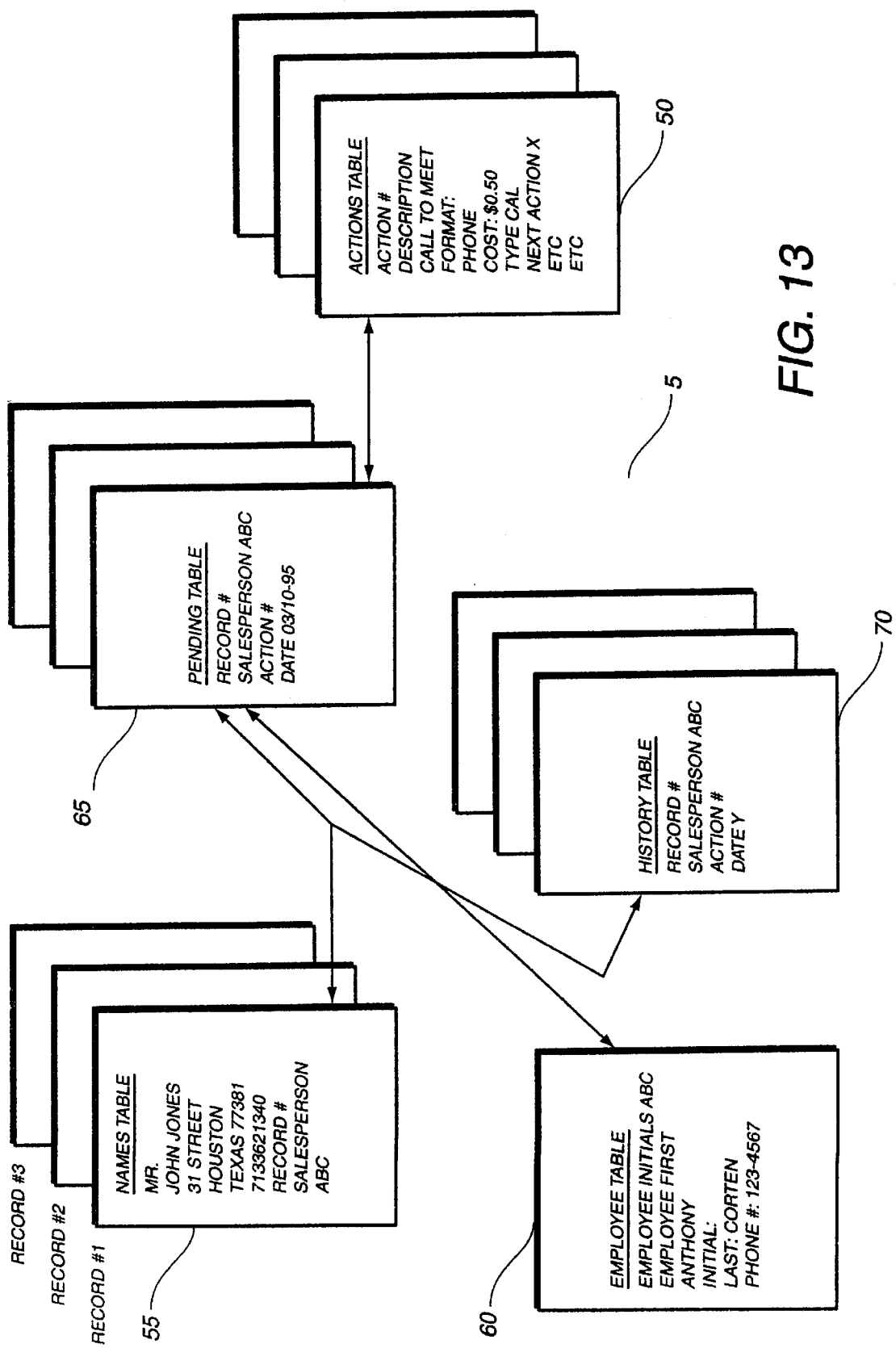
FIG. 13 is a schematic diagram depicting the interrelationships between common fields contained in a knowledge base contemplated by the preferred embodiment of the present invention.

To represent this sales scenario in which a salesperson is scheduled to make a telephone call seeking a meeting with a prospect, computerized smart system 2 comprising the preferred embodiment would interrelate the databases depicted in FIG. 2. The salesperson is identified to this system by a record in Employee database table 60. Similarly, the prospect is identified by a record in Names database table 55. FIG. 13 depicts the interrelationships between common fields contained in a knowledge base contemplated by the preferred embodiment of the present invention. The Names record for the prospect, shown as John Jones, contains a field indicating the employee, shown as salesperson ABC, with primary responsibility for making a sale happen. The scheduled action of salesperson ABC to "Call to meet" prospect Jones is stored in an Actions database; such a telephone call is represented in the Actions table as having a Phone Format, having a Call Type, and having an associated cost of $0.50. As will become clear to those skilled in the art, output for an action having a Phone Format will be sent directly to a telephone line or to an on-screen module and the like to be displayed, instead of being sent to a printer to generate hard-copy and the like.

Still referring to FIG. 13, the Pending database shows that salesperson ABC has a pending action number 1 to be performed on the entity contained in record number 1 of the Names database. It should be evident to those skilled in the art, that the references contained in a Pending database record are easily ascertained by retrieving the matching record in the related database table. Thus, a particular entity is ascertained from the Names database, an employee having primary responsibility for the entity is ascertained from a related record in the Employee database, and related action descriptions and attributes are ascertained from the likewise related Actions database. According to the teachings of the present invention, it is the pending action for ABC that determines that ABC is to make a call. In setting up this action, a smart system merely uses the field containing employee identification in the Names database as a default.

As hereinbefore described, to completely describe an action, fields should be defined by the user. Such action definition should preferably include: action name; action format; action type; associated cost; action number; next action(s), i.e., subsequent series of action(s); elapsed time until the next action(s) (minutes or hours or days) are scheduled to occur; related action(s), if any, which are replaced by the action; whether the action is an "initial" action; what prerequisite action(s) must have occurred for this action to be processed; where the action is an "option" from (if any); length of notes to be posted; "update fields"; text amplifying the action. For example, the action name may be "Call to arrange a meeting" which, of course, effectively describes the purpose of the action. As hereinbefore described, the Format for this action may be identified as "Phone"; the Type may be identified as "Call"; the cost may be established as $0.50 corresponding to time, line charges, etc.; the action number is set by the smart system and is sequentially assigned, e.g., the first action added would have action number 1, the second would be action number 2, etc. The remaining action-defining fields will be described hereinafter.

Once the first action (Action Number 1) is defined in a smart system, this action will permanently be referenced for convenience as "PHONE.1" in the strategy taught by the present invention. Thus, according to the present invention, an action is preferably named by its Format followed by a sequential action number, namely:

Format Name.Sequential Action Number

Now that an action has been "created" in a smart system, the action should be presented to an appropriate salesperson, i.e., an entity that exists in the real world scenario. This is accomplished by associating a pending action with the name of the prospect to be called and the identifier for the employee who will perform the action on the prospect.

Using relational database techniques known in the art, as depicted in FIG. 13, an action is linked to a named entity via fields contained in related tables comprising the hereinbefore described knowledge base. It is an important aspect of the present invention that all of these constituent tables are appropriately interrelated so as to render any and all needed information instantaneously available from the knowledge base to ascertain strategies for effecting activities and events in the real world scenario being emulated.

In the instant example, so far, there are only two players: (1) salesperson ABC and (2) prospective customer Jones who salesperson ABC is scheduled to call. As should be evident to those skilled in the art, an automated system contemplated by the present invention should preferably provide comprehensive and cumulative knowledge of the interrelationship of all of its predefined entities and employees in the context of the particular business scenario in order to continuously and accurately emulate real world events. According to the teachings of the present invention, an action is what the salesperson must perform to the named prospect (or, in general, what must happen to the named entity). Thus, an action should preferably be in one of two states: completed or pending. Until completed, of course, an action is pending.

Under the present invention, as shown in FIGS. 2 and 13, pending actions like "Call to meet" are stored in Pending database 65. Similarly, completed actions are stored in History database 70, by being moved from the Pending to the History database. All named entities are defined and stored in Names database 55. As hereinbefore described, the relationship between actions and named entities in the preferred embodiment throughout smart system 2 using knowledge base 5, comprising Names table 55, Employee table 60, Actions table 50, Pending table 65 and History table 70, is illustrated in FIG. 13. As is clearly shown, Names record #1 has a pending action attached to it in Pending table 65. The pending action is Action Number 1. Thus, by referring to Actions table 50, it is seen that Action Number 1 corresponds to "Call to meet" (various other descriptors are also available to the system). It is also seen that Pending table 65 stores the identity of the salesperson who is due to perform this action and when the action is due to be carried out. It is further seen that named entity number 1 is due to receive the action, i.e., the call, from salesperson ABC.

Those skilled in the art will appreciate the improvements and enhancements taught by smart system 2 contemplated by the present invention. Multiple employees may readily be scheduled for actions pending to be performed upon the same named entities, i.e., upon the same record in Names database table 55. It is a feature and advantage of the present invention that all employees as users of a smart system may have access to information contained in a plurality of records stored in Pending database table 65 and History database table 70, corresponding to those records which are relevant to particular customers and the like. That is, unlike computerized expert systems and the like heretofore known in the art, all users of such a smart system may have access to all actions and events that are scheduled to occur and that have already occurred, for particular customers and the like.

Continuing with the salesperson-prospect scenario, assume that the day of the scheduled telephone call arrives. According to the methodology taught by the present invention, salesperson ABC would identify himself to smart system 2. The system would then display all relevant information about the entity, i.e., prospect, scheduled to be acted upon, i.e., to receive a phone call and the nature of the call. That is, as will be appreciated by those skilled in the art, there may be several types of phone calls made by employees. While, in this instance the nature of the call is to attempt to arrange a meeting ("Phone to meet"), there may be another call scheduled later in the sales cycle to follow up a proposal ("Phone to follow-up on proposal"). The particular scheduled action is displayed to the user. As should be clearly understood by those skilled in the art, this behavior corresponds to a human action. Of course, while for each business scenario and the like, human intervention is intertwined with inherent objectives and goals, there can be computer-generated actions which may be effectuated independently of such human intervention. An example of a computer generated action is preparing a form letter to document a past event or to confirm a predictable current or future event.

In the instant real world scenario, once salesperson ABC actually calls prospect Jones, there are a finite number of situations which may occur next. For example, the prospect may either: (1) say "Yes" to a meeting; or (2) say "No" to a meeting showing a lack of interest in the product being offered for sale; or (3) say "No" to a meeting and request that information be sent; or (4) be unavailable or unable to receive the call, wherein a message was left with staff or on an answer machine or on voice mail; or (5) say "Wait" because prospect Jones is too busy at this time to meet with salesperson ABC, but Jones requests another call in a specified period of time, e.g., "x" months. To completely emulate an actual business scenario enabling a proper strategy to be developed, these enumerated options should preferably be expanded to depict all of the options that might be available to a user. For simplicity, however, assume that these five options are the only possibilities.

While each of these possibilities constitute actions which should preferably be contained in the Actions database, each of these actions also correspond to subsequent actions depending from the predecessor action. Accordingly, under the present invention, these possible subsequent actions are designated as being "options from" predecessor action number 1. Thus, it is a feature and advantage of the present invention that a user would only be presented with these options when calling a prospect within the scope of an action number 1. That is, another phone action, e.g., making a call to confirm a meeting, would have a different series of possible subsequent actions and hence would have different options from such initial action.

Now referring to FIG. 23, an employee, having previously identified the possible subsequent actions from a "Call to meet" action (Phone.1) has added these actions to the Actions database. In particular, the "Yes" action, i.e., Yes to a meeting with a salesperson, may be a Letter Format (Letter.2), wherein a letter confirms the date and the time of the meeting. This Yes action would, in turn, have a next action X (Reminder.X) which should preferably be a reminder of the meeting. That is, a Reminder action would attempt to minimize the chance of a salesperson inadvertently missing the scheduled meeting. Under the preferred embodiment, a reminder action by default indicates that a meeting is scheduled to occur in zero days, thereby prompting a user to specify the planned number of days until the meeting will be held. It is a feature and advantage of the present invention that any next action scheduled for zero days hence prompts the user to edit the number of days until the specified next action is due to occur.

The "No" action, i.e., No to a meeting indicating lack of interest or lack of time availability, would probably be a Suspend Format (Suspend.3). Under the present invention, a Suspend Format erases all pending actions for the named entity. The "Send information" action would typically be a Letter Format corresponding to a cover letter to the information package being forward to the prospect (Letter.4). As shown, the next scheduled action would be to repeat the "Call to meet" action (Phone.1) to attempt to have a follow up meeting: the next action would be action Number 1 to occur in a prescribed number of days, e.g., in seven days (since another call is necessary to set up the meeting).

Still referring to FIG. 23, the "Left message" action (Null.5) would be a Null Format, i.e., no immediate action, assuming that the default Formats supplied with the preferred embodiment are used. As a next action, however, it might be advisable to schedule another attempt to reach a prospect by phone, i.e., to set next action as action Number 1 in two days or some other time frame. Similarly, the "Wait" action would be appropriate for a situation in which a salesperson places the entity in abeyance; this would be appropriate if a salesperson's "leads" suggest that the prospect should be called again in a suitable time frame, e.g., a month, two months, two weeks, etc. In the first of these waiting possibilities (action letter.6), a form letter would be forwarded to the prospect and the user schedules a (follow up) call back to be made in one month.

Assume that it is the practice of the particular sales business to maintain regular contact with a prospect after the first call is made and before the next call is made. Accordingly, a total of 3 letters might be sent to the prospect prior to the follow up call being made. This is shown in FIG. 23 as the sequence of Letter.6 followed by Letter.9 14 days later, followed by Letter.10 10 days later. Hence, under these circumstances, Letter.6 would thank the prospect for visiting with the salesperson during the call; Letter.9 would just touch base with the prospect; and Letter.10 would alert the prospect to expect an imminent call. Alternatively, Letter.7 would be a form letter similar to Letter.6 but would advise the prospect that a follow up call is scheduled for two months later; Letter. 11 would just touch base with the prospect 35 days later; and Letter.10 would alert the prospect to expect an imminent call 17 days later. Alternatively, Letter.8 would be a form letter similar to Letter.6 and Letter.7 but would advise the prospect that a follow up call is scheduled for two weeks later, Letter.10 would alert the prospect to expect an imminent call 10 days later. This, then, for instance, would schedule Phone.1 to occur in 7 days.

It is thus within the teachings of the present invention to bias users to fully define the inner workings of a business environment so that a smart system may accurately accomplish the intended emulation. In this particular telephone cycle, there are several alternative action sequences that follow from an attempted call to a prospective customer to set up a meeting. The sequence of possible actions springing from action Phone.1, namely, Letter.2, Suspend.3, Letter.4, Null.5, Letter.6, Letter.7, Letter.8, Letter.9, Letter.10 and Letter.11, are understood by the preferred embodiment and enable requisite processing to occur either automatically or with minimal human intervention.

Thus, to the extent that such a computerized system contemplated by the present invention has been educated that the best way to keep in contact with a seemingly interested prospect is to send three letters to the prospect during the month, then the preferred embodiment would automatically schedule three such letters as three successive next actions. The first letter would thank the prospect for time expended during the initial phone conversation. Perhaps, two weeks later, another letter would be sent to simply touch base. The third letter would then be sent perhaps ten days thereafter to inform the prospect to expect an impending call to schedule a meeting. The latest letter would have "Call to meet" as its next action in a user specified number of days, e.g., 7 days, thereby completing the cycle.

As will be appreciated by those skilled in the aft, the present invention provides an automatic and a manual processing capability. Assume that there are two pending printable actions, with one action having set up the other, e.g., as a next action. Under the present invention, automatic processing methodology traverses the entire Pending database to select the actions scheduled for completion through the specified date. Inherent in automatic processing contemplated by the present invention, as should be appreciated by those skilled in the art, is the concomitant establishing of pending actions from telltale fields in other actions. As has been herein described in detail, such fields as NEXT_1, NEXT_2 and NEXT_3, such fields as FROM_1, FROM_2 and FROM_3 and such fields as REPL_1, REPL_2 and REPL_3 in the preferred embodiment convey the interdependencies between pending and future actions. Thus, if a letter action is set up by another action, e.g., a meeting, then prior to actually printing the letter, specific text must be merged into a prescribed form. This is accomplished using the Process database which coordinates, for a specified date (via field PROC_DATE), a particular action and its associated Format (via fields ACT_NUM and ACT_FMT) with the employee performing the action (via field EMP_ID) and, of course, the description of the textual content of the letter (via field TODO).

This processing contemplated under the present invention is depicted in the flowchart in FIGS. 22A–F. First referring to FIG. 22A, in the step represented by numeral 1000, the date through which processing should be performed is obtained from a suitable location in memory. The Pending database is then opened in step 1005. In step 1010, all records are copied to a temporary file, having records with a scheduled activity date less than or equal to the date specified in step 1000 and also records with a scheduled activity date greater than the specified date. As will be appreciated by those skilled in the art, it is advantageous to make a temporary copy of the Pending database so that ongoing activity over a local area network and the like will be uninterrupted, i.e., automatic processing may proceed without requiring exclusive use of the Pending database. Using a temporary database also provides efficiency (by eliminating loops) when processing an action having a next action with an elapsed time of zero days. In the next step, represented by numeral 1015, records with a scheduled activity date greater than the specified date are deleted from this temporary file. Once the pending records to be processed have been isolated in the temporary file, which, as will be appreciated by those skilled in the art, is preferably defined with the same record layout and attributes as the Pending database record, the temporary file is opened and positioned at the first record therein, in steps 1020 and 1030, respectively. Then, as depicted in step 1030, the steps depicted in FIGS. 22B–F are performed so long as a end-of-file condition is not reached in the temporary file.

Figure 22B:
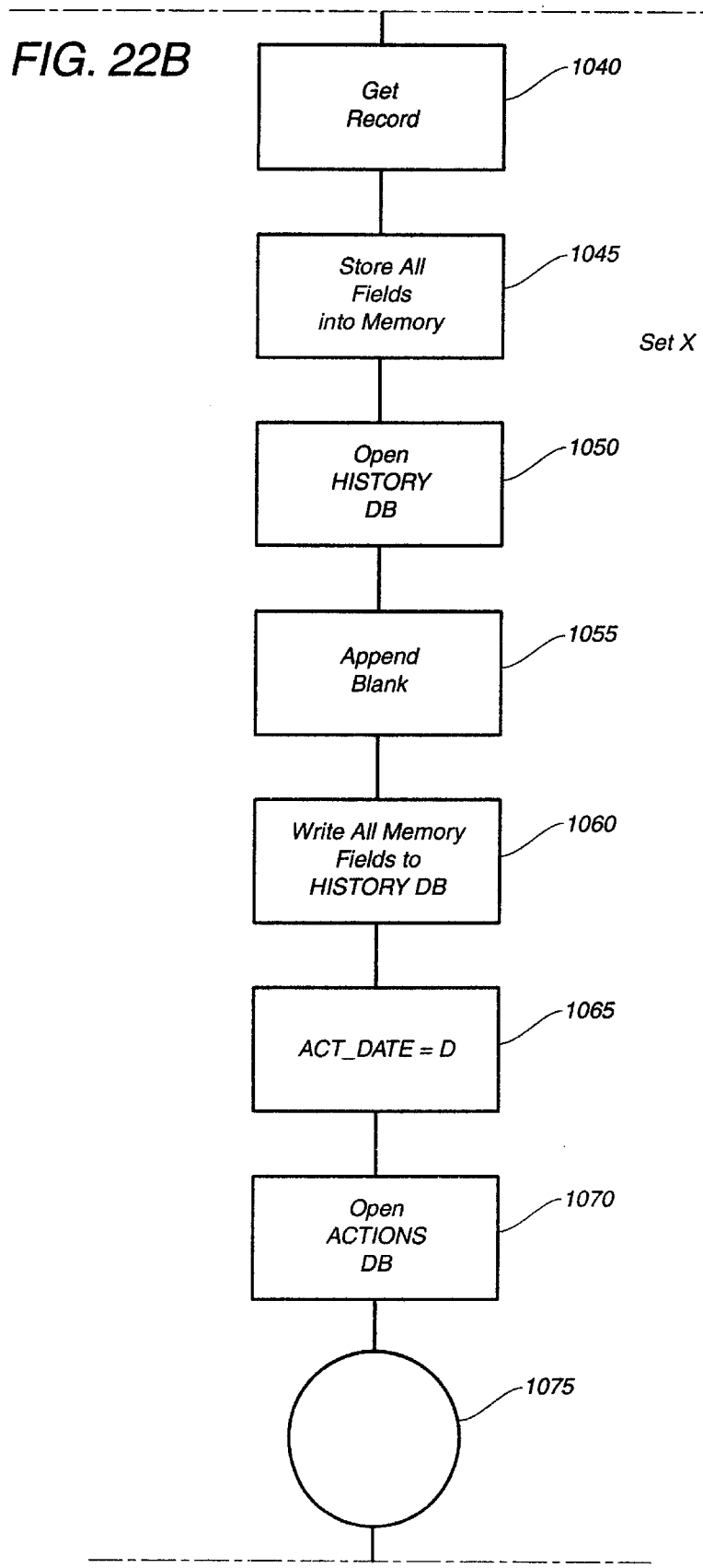
Figure 22C:
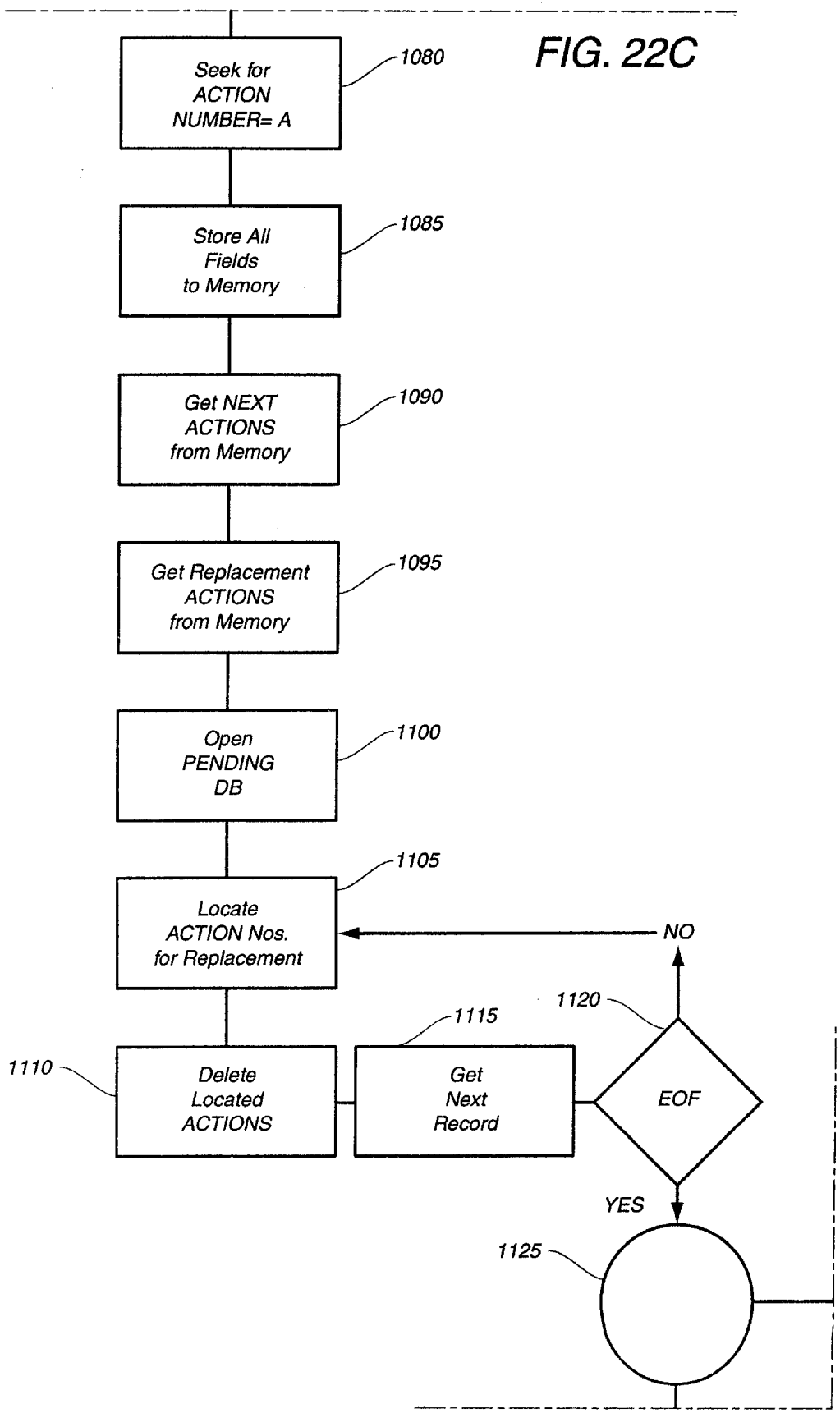

Referring now to FIG. 22B, a temporary file pending record is obtained in step 1040 and its field contents loaded into memory (e.g., ACT_NUM=A, NUMBER=B, EMP_ID=C, etc.) in step 1045. Next, in steps 1050 and 1055, the History database is opened, and a blank record is appended thereto, respectively. In accordance with the present invention, any time that a database table is opened, it is assigned a unique work area in memory so that a plurality of databases may be opened and processed simultaneously. Thus, if it is assumed that the temporary file corresponding to the Pending database table is contained in a first work area, then another temporary file corresponding to the History database table is contained in a second work area. In step 1060, all of temporarily saved pending activity information contained in memory is written to this appended record (e.g., variables A, B, C, . . . ). It should be understood that the memory variable storing employee information is obtained from the Pending database, enabling the existence of a plurality of pending actions to be performed by a plurality of employees against a single entity. This constitutes a significant departure from the prior art wherein employee is generally obtained from the related entity contained in a Names database and the like, thereby limiting to only one the number of pending actions to be performed against an entity. The scheduled date for the current activity is obtained in step 1065 and then (step 1070) the Actions database is opened. Similar to the Pending and History tables, a temporary actions table is stored in memory in a third work area. Referring now to FIG. 22C, an Actions record is sought having the action number stored in memory (shown as value A) in step 1080. For the Actions record found in step 1080, all data fields are stored in memory (set "x") in step 1085. Then, in steps 1090 and 1095, the set of the next actions fields and the replacement actions fields are retrieved from memory, and after the Pending database is opened (1100), the actions to be replaced are sought in steps 1105–1150. More particularly, all pending actions found in step 1105 are deleted from the work area corresponding to the Pending database in step 1110; all of the candidate pending records are traversed in steps 1115 and 1120. It should be clear that the memory variables retrieved in step 1090 identify the set of next actions and the elapsed time in which this (next) action is scheduled to occur. It should also be clear that the memory variables retrieved in step 1095 indicate the pending actions that should be replaced by action A.

Figure 22D:
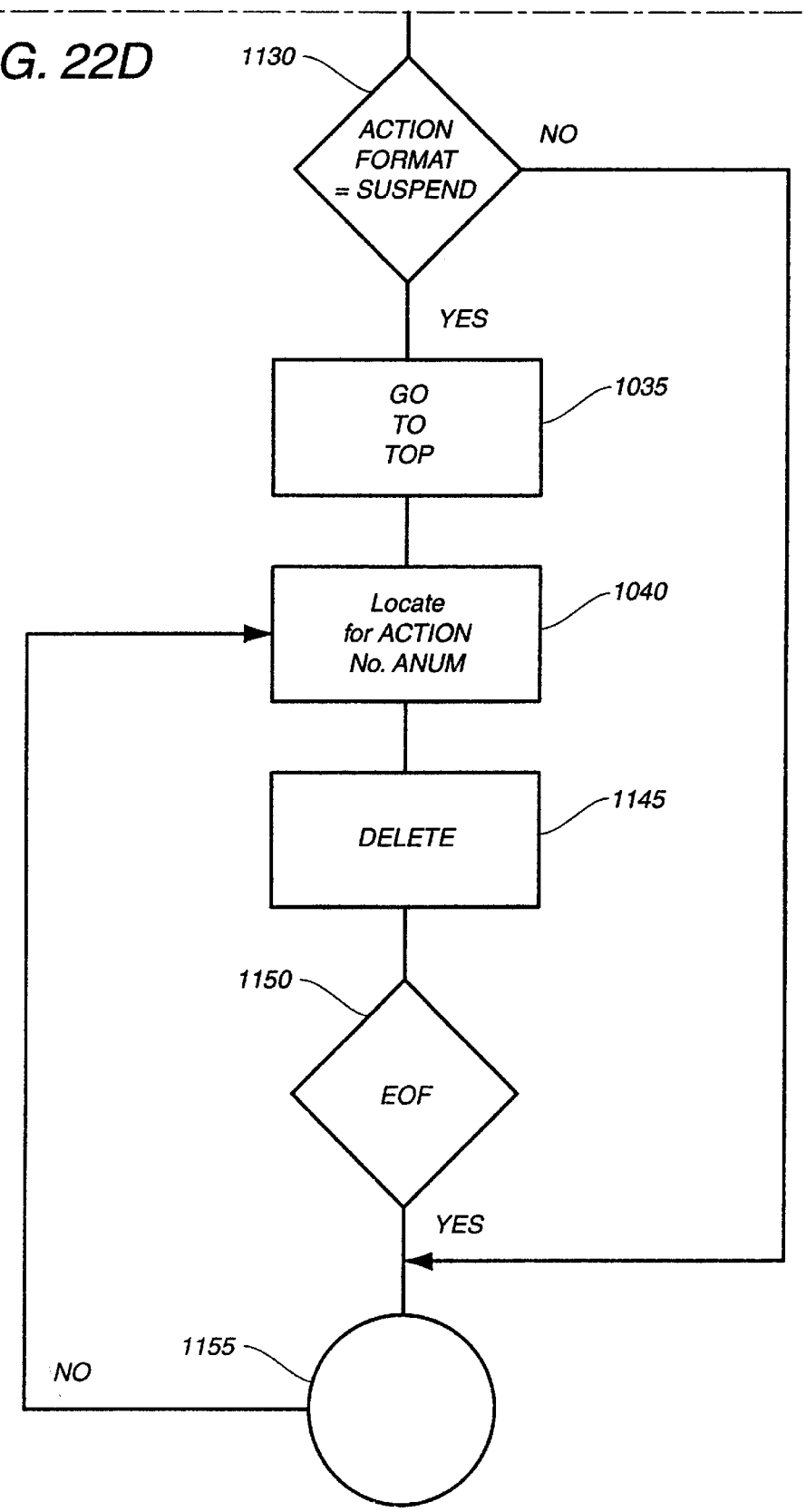
Figure 22E:
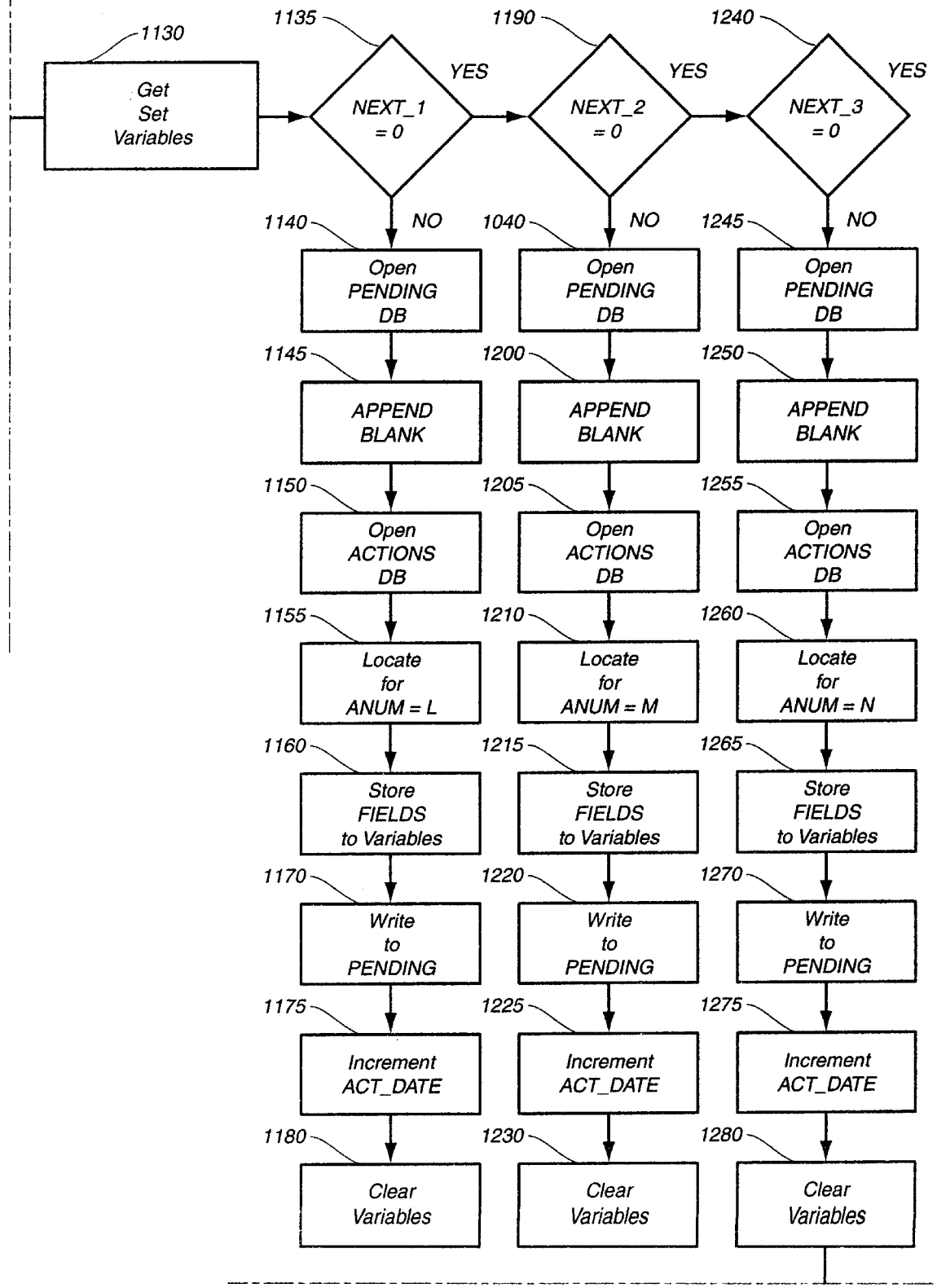

Now referring to FIG. 22D, there is shown the automatic processing logic for pending actions satisfying the date criterion and having a Suspend Format; pending records with a Suspend Format are effectively canceled in steps 1135–1150, while pending records with a Format other than Suspend proceed directly to step 1130 (FIG. 22E). For each such pending record found with a Suspend Format in step 1140, the record is deleted in step 1145.

Referring now to FIG. 22E, steps 1130–1280 are shown for adding next actions to the Pending database for the particular action being processed. Depicted in FIG. 22E are three identical paths, steps 1135–1180, steps 1190–1230 and steps 1240–1280, corresponding to the automatic processing for each of the three next action couplets (action number and elapsed time in which the action is scheduled to occur) contained in the preferred embodiment. Thus, step 1135 ascertains whether there is a first next action. If there is a first next action, then it is processed in steps 1140–1180, wherein the Pending database is opened (1140) and a blank record is appended thereto (1145). In the following step represented by numeral 1150, the Actions database table is opened and a matching record with value L stored in memory is sought (1155). The values stored in this Actions record, in a manner similar to hereinbefore described, are copied to memory variables (1160) and then written to the Pending database table (1170) with its date field appropriately incremented (1175). All of these memory variables are then cleared (1180) and processing continues in step 1190 for the second next action. The processing for this next action takes place in steps 1190–1230 similarly to the processing in steps 1135–1180 for the first next action. Similarly, all of the memory variables corresponding to the second next action are then cleared (1230) and processing continues in step 1290 for the third next action. The processing for this next action takes place in steps 1240–1280 similarly to the processing in steps 1190–1230 for the second next action.

FIG. 22F depicts the automatic processing related to employees and is designed to permit printing across multiple branch locations which may be interconnected via a wide area network and the like. In steps 1295 and 1300, respectively, the Process and Employee database tables are opened, copied to different work areas in memory, and a blank record appended in memory to the Process table. Under the preferred embodiment of the present invention, the Process table is copied to a third work area and the Employee table is copied to a fourth work area. In step 1305, the employee value from set x (step 1085) is located in this Employee table and the division information is stored in a memory variable (1310) which is then written to the appended record (1315) along with the relevant information stored in memory (1320), e.g., action number, employee id, snf ther process date (1325). Processing then shifts to the novel Update Fields aspect of the present invention in 1330, as herein described in detail, after which all memory variables are cleared (1335).

Manual processing of a completed single action under the present invention comprises removing the action from the Pending database and placing the record in the History database, and then setting up a plurality of follow-up actions in the Pending database. As should be understood by those skilled in the art, under the automatic processing aspect of the present invention, such a plurality of follow-up actions would be automatically set up for the completed action during its smart follow-up methodology. Thus, for manual processing of a completed action, the completed action is first selected from the plurality of pending actions and set up in the Process database with appropriate values for fields ACT_NUM, ACT_FMT, EMP_ID, ZIP, EMP_DIV, TODO and PROC_DATE. The completed action is, of course, moved from the Pending to the History database, and appropriate follow up actions are then set up in the Pending database. Any necessary changes to fields in the Names database are, as has been hereinbefore described, loaded into appropriate fields (FLDNAME, CDATA, NDATA, DDATA, LDATA, DTYPE and ADDTO) of a plurality of records contained in the Update database, for automatic implementation via the Update Fields aspect of the present invention.

It is also within the teachings of the present invention to alteratively accomplish its manual processing aspect by first manually selecting or adding a particular action and setting an intended processing date, and then permitting the appropriate action to be effectuated on the specified date via the automatic processing aspect. That is, after a particular action is either selected from or added to the Pending database and this action's processing date specified, the action is actually processed some time in the future via the automatic processing methodology.

As has been hereinbefore described, pending actions which are stored in the Pending database are linked to persons and the like stored in the Names database through the Names record number. That is, any pending action that contains value "141" in field NUMBER of the Pending database corresponds to an action for record number 141 in the Names database. In prior art systems, however, pending actions have typically been designated by who would perform an action on a particular named entity in an equivalent of a "names" database. Thus, such a prior art computer system would schedule a specific pending action to be performed by employee ABC simply because names record number 141 would store ABC in field EMPLOYEE upon names record number 141 limited to one record in the equivalent of a Names database. Obviously, this has been a serious limitation upon the functionality of computerized scheduling systems and the like because the approach is to schedule only a single action to be performed by a single employee upon a particular named entity in the business environment being modeled. But, as is clear to those skilled in the art, frequently several employees interact with one particular entity characterizing a business environment and the like. As will be appreciated by those skilled in the art, such a plurality of pending actions scheduled to be performed by a plurality of employees for a single entity significantly improves the art and, indeed, enables business environments and the like to be accurately and effectively emulated, not merely simplistically modeled.

Hence, the present invention addresses such real world circumstances by combining pertinent information stored in the hereinbefore described Actions database (see FIG. 10) with pertinent information stored in the hereinbefore described Employee database (see FIG. 9) and then by storing such information about pending actions in a Pending database. Now referring to FIG. 14, there is seen a layout of such a Pending database record. Field PEND_DATE stores the date that a particular action is scheduled to occur in the business scenario being emulated. Fields ACT_NUM and ACT_DESC store the unique number and associated description of the pending action to be performed.

As shown in FIG. 14, storing employees' initials in Pending field EMPLOYEE relates the pending action to the employee who is scheduled to perform the activity. Field NUMBER relates the pending action to the entity in the Names database upon whom this action will be performed. As will become clear to those skilled in the art, field PROC_DATE stores the date that the action is actually performed. As will be hereinafter described in detail, logical field PHONE indicates whether the instant action has a Phone Format and logical field FONE_DONE indicates whether this telephone call has been completed. These Pending fields, of course, enable all pending actions to contain information pertaining to which employee is to perform a pending action, when the action is scheduled to be accomplished, and to whom or to what such action relates.

As an example, suppose that salesperson ABC sells high volume photocopier equipment and that salesperson DEF sells low volume copier equipment. While performing her duties, salesperson DEF engages in a telephone conversation with a prospect who informs her that his company is seeking a high volume copier. Since DEF has been assigned primary responsibility for this customer account, she makes an entry in the Pending database for salesperson ABC to make contact with this prospect An appropriate pending action for salesperson ABC might be a reminder to make a follow-up telephone call. The primary responsibility for this prospective customer may also change from salesperson DEF to salesperson ABC. DEF made telephone contact with this prospect because she had a pending action of "Call to meet" for that particular day. As a preferred strategy, salesperson DEF could trigger an option to transfer the prospect to salesperson ABC based on the knowledge acquired during her telephone conversation with the prospect. Under the teachings of the present invention, an Option From function would be invoked causing a transition from DEF's "Call to meet" action to ABC's corresponding "Call to meet" action, but in a short period of time thereafter, e.g., make telephone contact in 1 day. Thus, in the Pending database, the next action for salesperson ABC is the directive that this particular customer account should be called to promote sale of a high volume copier.

According to the preferred embodiment, whenever such a transfer from one salesperson to another occurs, i.e., whenever the contents of field ACTION_DESC contains the action "Transfer to another salesperson," there should be set up a concomitant action to immediately send a confirming letter or perhaps facsimile transmission thanking the prospect for conversing with salesperson DEF and indicating that salesperson ABC will be calling imminently. Of course, other actions may be established for this scenario, and any number of sets of actions may be established based upon business decision-making rules.

Under the teachings of the present invention, whenever an action is specified in the Pending database, the user is asked whether the instant action is to be performed by another named person contained in the Employee database. If the user responds affirmatively, then the names of all employees stored in the Employee table as part of the Names database are displayed for selection of the salesperson to whom the transfer is being made. Once this selection is made, the present invention further inquires into the scope of the modification or transformation. As should be evident to those skilled in the art, it is necessary to ascertain whether the new employee is updated only in the Pending database or whether there should also be updates related to the action being processed, e.g., assignment of responsibility of further contact with a prospect from employee DEF to employee ABC.

For the instant illustrative scenario, employee ABC is applied only for the "Call to meet" pending action because salesperson DEF actually performs the follow-up action of writing the confirming letter to the prospect. As will be understood by those skilled in the art, an action like "Assign to another salesperson" is performed by salesperson DEF and would be stored in the History table under employee DEF. According to the present invention, once a pending action is completed, the action is deleted from the Pending database and stored in a related History database. FIG. 15 depicts a layout of a History database record. The relationship between corresponding (former) records stored in the Pending database and records stored in the History database should be evident to those skilled in the art. Field HIST_DATE stores the date that an action was completed. Fields ACT_NUM and ACT_DESC store the number and associated description of the action performed. Field EMPLOYEE stores identification of the employee who performed the completed; as hereinbefore stated, the preferred embodiment uses employees' initials to identify employees in a smart system taught by the present invention. Field NUMBER relates the completed action to the entity in the Names database upon whom this action was performed.

Thus, under the present invention, before the telephone call to prospective customer 141, the Pending table might contain the following values for this scenario:

| PEND_DATE | ACT_NUM | ACT_DESC | NUMBER | PHONE | PHONE_DONE | EMPLOYEE | PROC_DATE |
|---|---|---|---|---|---|---|---|
| 1/5/95 | 10 | Call to meet | 141 | T | F | DEF | |

For a date of Jan. 5, 1995 stored in field PEND_DATE of the Pending database, field ACT_NUM contains action number "10" with corresponding description "Call to meet" stored in field ACT_DESC, for Names database record number "141" stored in field NUMBER. This entry, prior to the telephone contact being made, shows that field EMPLOYEE contains the name of employee DEF who is scheduled to make a telephone call, represented by the value "T" stored in field PHONE and that this has not yet been performed, represented by the value "F" (false) stored in field PHONE_DONE. Since the action has not yet been performed there is no entry in field PROC_DATE.

Immediately after the telephone call to this prospective customer, the Pending table might contain the following values for this scenario:

-continued

| HIST_DATE | ACT_NUM | ACT_DESC | NUMBER | EMPLOYEE |
|---|---|---|---|---|
| 1/5/95 | 12 | Thank you fax | 141 | DEF |
| 1/5/95 | 10 | Call to meet | 141 | DEF |

| PEND_DATE | ACT_NUM | ACT_DESC | NUMBER | PHONE | PHONE_DONE | EMPLOYEE | PROC_DATE |
|---|---|---|---|---|---|---|---|
| 1/6/95 | 10 | Call to meet | 141 | T | F | ABC | |
| 1/5/95 | 11 | Assign to another salesperson | 141 | F | F | ABC | |
| 1/5/95 | 12 | Thank you fax | 141 | F | F | DEF | |
| 1/5/95 | 10 | Call to meet | 141 | T | T | DEF | 1/5/95 |

After the telephone call has been made by employee DEF, the processing date is recorded as "Jan. 5, 1995" in field PROC_DATE and the value "T" (true) is stored in field PHONE_DONE. The Pending table completely captures the sales situation regarding prospect 141: employee DEF has completed a "Call to meet" and the smart system has set up another "Call to meet" but to be made perhaps the next day by another employee, ABC. Contemporaneously, an action to assign this prospect to employee ABC instead of emplyee DEF has also been set up. According to the protocol of the business being emulated, prior to newly assigned employee ABC making this "Call to meet," a facsimile will be sent to prospect 141 by employee DEF, thanking the prospect for the time spent engaged in a telephone conversation with employee DEF.

As has been hereinbefore described in detail, during automatic processing or manual processing of a smart system, once completed, a pending action is deleted from the Pending database and a corresponding record is created in the History database. Thus, assuming that all of employee DEF's actions relative to prospect 141 have been completed, for this prospect, there is only one pending action to be performed by employee ABC:

As should be clear to those skilled in the art, a true value stored in logical field PHONE indicates to the smart system that the action corresponding to Phone Format. To satisfy real world requirements, a smart system constructed according to the preferred embodiment treats a Phone Format differently from other Formats: an action having a Phone Format is preferably sent to a Call Processing screen for specifying the date through which telephone calls will be made to Names entities. After a phone call is completed, under the present invention, a follow-up action must be chosen in order to remove this completed phone action (Pending action record) from the telephone processing screen. The user may then proceed to the next scheduled phone call. Once a pending call is completed, the smart system changes the value stored in logical field FONE_DONE from "false" to "true."

Thus, a smart system contemplated by the present invention completely portrays the dynamics of a predefined business environment and the like, and continuously emulates its operation. As illustrated in this example involving a single prospect and two employees, for a hypothetical pending time frame of Jan. 5–6, 1995, the Pending and History databases, coordinated with the related Names, Employee

| PEND_DATE | ACT_NUM | ACT_DESC | NUMBER | PHONE | PHONE_DONE | EMPLOYEE | PROC_DATE |
|---|---|---|---|---|---|---|---|
| 1/6/95 | 10 | Call to meet | 141 | T | F | ABC | |

Since the contents of field PHONE_DONE is false and there is no date stored in field PROC_DATE, the phone action is still pending. After being processed by a smart system, these completed pending actions have been deleted from the Pending database and corresponding records have been created in the History database:

| HIST_DATE | ACT_NUM | ACT_DESC | NUMBER | EMPLOYEE |
|---|---|---|---|---|
| 1/5/95 | 11 | Assign to another salesperson | 141 | DEF | and Actions tables, emulate the sales scenario with minimal salesperson or management intervention. As has been hereinbefore described the Actions database stores the action numbers and corresponding descriptions for all actions that characterize a particular commercial business environment and the like.

Referring now to FIG. 13, the interrelationships between Names table 55, Pending table 65, Actions table 50, Employee table 60 and History table 70 are depicted for this illustrative example. The unique record number of a person stored in the Names table comprises the linkage to the Pending and History tables. The action number stored in the Pending table is linked to the unique action number stored in the Actions table along with the description and other relevant information for this particular action. Thus, for a "Call to meet" action, it is shown to be a telephone call with a cost of $0.5. The unique employee number stored in the Employee table comprises the linkage to the Pending and History tables for a particular salesperson and the like.

Another important and innovative aspect of the present invention is the Update Fields feature. When an action is processed either by a user or automatically during "Smart Follow Up" as herein described (see FIGS. 22A–F), the present invention teaches a capability to change the contents of one or more fields in the Names database. As will be appreciated by those skilled in the art as a significant departure from the prior art, a purpose of this Update Fields feature is to automate record editing.

As an example, suppose that a sales manager regarded any person who had met one of his sales people as a prospect. Suppose further that this manager wants to keep a tally of the number of contacts received by any and all records contained in the Names database. According to the present invention, pursuant to building a knowledge base, two fields should preferably be implemented; one field would preferably be called STATUS and another would be called NUM_CONTACT. Both of these fields would be contained in the Names database: STATUS is a default 15-character field in the preferred embodiment and a numeric field NUM_CONTACT would be defined in one of the eight customizable fields DATAN1, DATAN2, . . . DATAN8 (see FIG. 8).

As part of the strategy incorporated into a smart system taught by the present invention, there would be an action named "Met with prospect" or the like. As will be appreciated by those skilled in the art such an action may or may not have a follow up action. Any time this (Met with prospect) action is processed, a smart system may be instructed (by, of course, appropriate user definition of the business scenario) to put the value "Prospect" or the like in field STATUS for the purpose of smart processing. Similarly, all other actions having Printable Formats could be instructed to add 1 to whatever value is stored in field NUM_CONTACT whenever these printable actions are processed.

As will be described in detail hereinafter, the Expert aspect of the present invention is continually searching for predefined profiles and, if appropriate, ad hoc user defined profiles in the Names database. As will become evident to those skilled in the art, an Expert action may then be triggered by another action being processed due to the Expert action being associated with update fields as contemplated by the present invention. This Update Fields function which automatically updates designated Names record fields is a significant advance over the prior art because it allows real world circumstances, i.e., circumstances defined in the business strategy, to alter database profiles. As will become clear hereinafter, Update Fields functions taught by the present invention may occur immediately after any action is processed. In particular, when an action is processed either manually by a user or automatically during Smart Follow-up, a smart system taught by the present invention may be instructed to alter the contents of one or more fields in the Names database (see block 1330 of FIG. 22F). Such an updating aspect of a smart system, of course, automates editing of existing Names records and assures that records contained therein remain current, i.e., remain synchronized with the real world being emulated.

As shown in FIG. 16, an Update database contemplated by the present invention preferably stores the number of the action which has an update field (ACT_NUM), the field it is updating (FLDNAME) and the value that should be placed in that field (CDATA, NDATA, DDATA, LDATA). Since there are various field types, namely, character, numeric, date and logical, the updating value must be stored in the appropriate field type: CDATA, NDATA, DDATA, LDATA, respectively. As will be appreciated by those skilled in the art, when a numeric field is being updated, it is important to know whether the update value increments or replaces the contents of the updated field. As will also be appreciated by those skilled in the art, when updating date fields, the option exists to place the current date, i.e., system date, in the designated date field or a specified date or a function of the computer system date (plus "X" by days, etc.).

Figure 18:
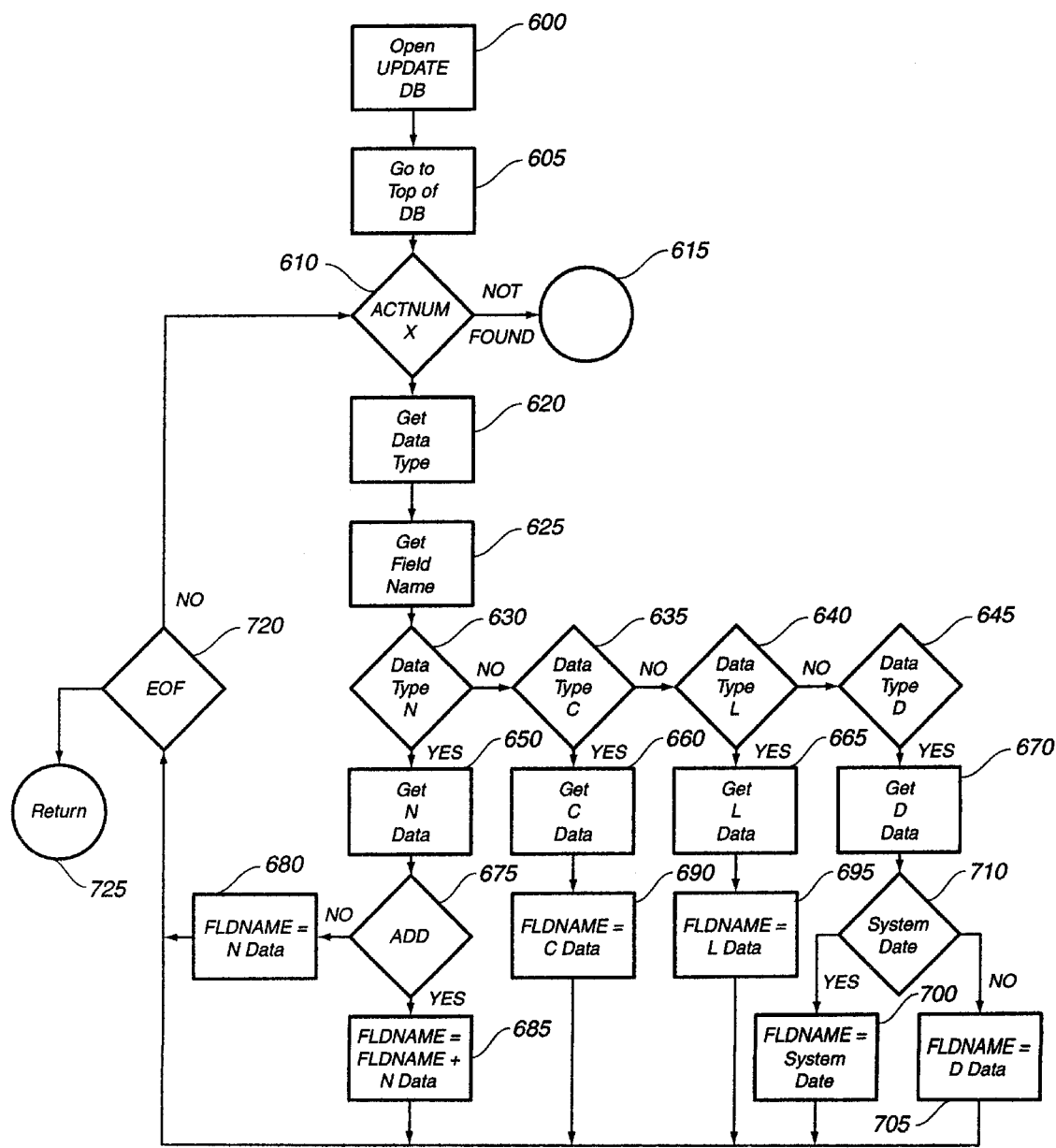
FIG. 18 depicts a flowchart of the of the Update Fields aspect of the preferred embodiment.

Now referring to the flowchart in FIG. 18, the Update Fields processing taught by the present invention is shown for an action number "X" which, of course, is known to the smart system from the Processing database, as a result of either manual processing or automatic (Smart Follow-up) processing. In the initial step represented by numeral 600, the Update database is opened. Next, in step 605, the Update Fields computer programmed module of the preferred embodiment prepares to commence searching for the record with the specified action number, from the top of the database to the bottom thereof. In step 610, if a record with the indicated action number is found, then processing continues with steps 620 and 625 to ascertain the data type and name of the field to be updated, which are stored in Update fields DATATYPE and FLDNAME, respectively. As shown in logic test steps 630, 635, 640 and 645, the data types may be either numeric (N), character (C), logical (L) or date (D). If an action number having specified value X is not found, then in step 615 the Update Fields module returns control to the calling computer program without generating a record in the Update database. Generally, of course, a record with the specified action value will be found, wherein the appropriate data type is obtained in one of steps 650, 660, 665 and 670, and then loaded into field FLDNAME in one of corresponding steps 675 or 680 (for numeric data), 690 (for character data), 695 (for logical data) and 700 or 705 (for date data). As will be apparent to those skilled in the art, for numeric fields, the numeric data stored therein may either be replaced or incremented with a new numerical value. Step 675 establishes whether numeric data should update the specified numeric field (in Update field FLDNAME) by superseding or incrementing the existing value. The existing numeric value is superseded in step 680 and incremented in step 685. For date fields, the updating value is frequently the system date corresponding to the current date, but it may also be a specified value. Step 710 ascertains whether the system date should be used or whether a particular date has been specified.

Figure 19:
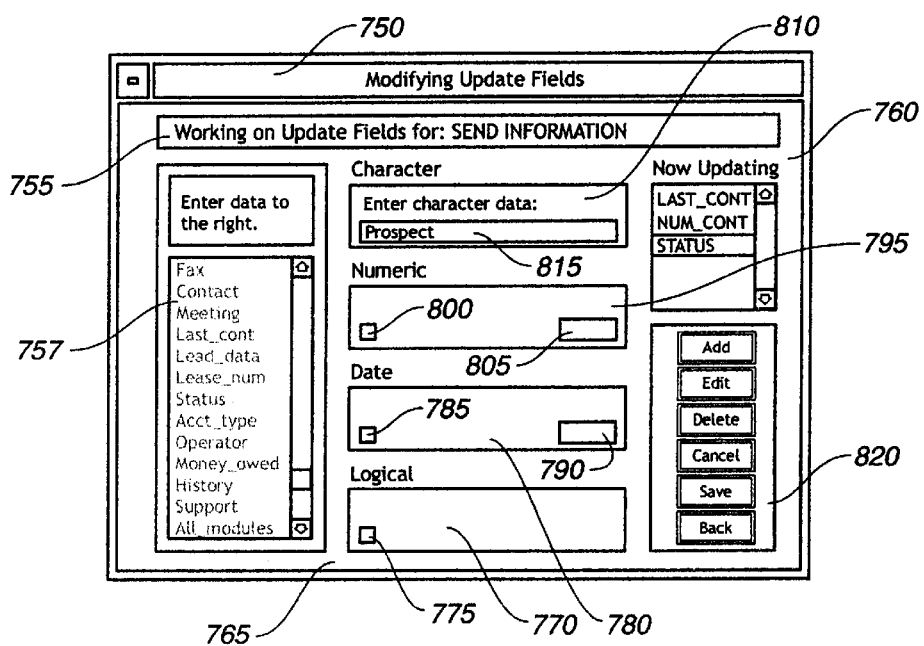
FIG. 19 depicts a computer screen for specifying a field to have its value updated via the Update Fields aspect of the preferred embodiment.

Referring now to FIG. 19, there is seen a screen presented to the user by the preferred embodiment of the present invention, for specifying a field to have its value updated via the Update Fields aspect. This screen comprises Modifying Update Fields title bar 750, action identification region 755, list of fields in Names database for updating 757, name of specified field for updating (Now Updating) 760, update value region 765 and function invocation region 820. Thus, according to the present invention, the user selects the Names field in screen list 757 which is then displayed in Now Updating region 760. Depending upon the data type of the field shown in Now Updating region 760, the cursor preferably is automatically positioned in the appropriate subregion of update value region 765. Thus, if the Names field to be updated is field STATUS (as shown), then a character string, e.g., Prospect (shown), is expected in subregion 750. If the Names field to be updated has a numeric data type, then numeric data is expected in subregion 795. Add value box 785 indicates whether the value entered in subregion 790 should supersede or increment the existing Names field value. According to the preferred embodiment, if the add numeric value box 800 is left blank, then the existing value is superseded by the value entered in box 805. Clicking in this box, on the other hand, indicates that the value entered in box 790 should increment the existing value stored in the Names field. If the Names field to be updated has a date data type, then either a particular date value is expected in subregion 790 or the system date will be automatically entered in the update field if the current date box 785 is invoked (by clicking, etc.). Similarly, if the Names field to be updated has a logical data type, then the value entered in the update field is false if box 775 in subregion 770 is left blank; if box 775 is clicked or otherwise invoked, then the value entered in the logical update field is true.

Referring again to the flowchart shown in FIG. 18, once data is loaded into the appropriate field in record X, the user may specify additional fields to be automatically updated. Steps 720 and 725, as will be appreciated by those skilled in the art, are associated with traversing the table seeking the specified record. If the end-of-file is reached before the specified record with action number X is found, then no Update record is generated.

As will be appreciated by those skilled in the art, in a strategy based system contemplated by the present invention, there may be several thousands of pending actions scheduled to occur on the same or on different days. Such pending actions may correspond to actions to be performed by different people or may correspond to an assortment of actions. As has hereinbefore been described, these pending actions are typically scheduled to implicate a plurality of different records in the Names database as, of course, related to records in the Pending database.

As will be also appreciated by those skilled in the art, a strategy based system contemplated by the present invention should preferably accommodate modifications of the particular subject matter of pending actions. Otherwise, a strategy based system will be unable to adapt to the plurality of adjustments and the like which are prerequisite to the ability of a computerized system to respond to actual scheduling and people accommodations in a typical real world commercial application and the like. For example, salesperson A plans a 7-day vacation in spite of a typically heavy workload. During salesperson A's vacation, however, suppose that 200 pending actions are scheduled to occur. Assume that for salesperson A the Pending table contains the following pending actions: 100 follow-up letters to be forwarded, 70 reminders to place telephone calls to prospects to be activated and 30 NULL Format actions. Absent a Delay Pending function taught by the present invention, upon salesperson A's return from vacation, he or she will be overcome by an abundance of pending actions, several of which would be effectuated later than schedule because of logistical limitations.

Of course, as should be evident to those skilled in the art, simply delaying a subset of pending actions may be inappropriate or contrary to business purposes. The type and extent of scheduling adjustments that may be permissible and, indeed, appropriate, depend upon the particular business environment and upon physical constraints dictated by the workplace. For instance, letters due during the vacation or shortly thereafter could be signed prior to salesperson A's departure. Alternatively, such letters could be signed upon salesperson A's return, but all telephone calls could be delayed an additional number of days, e.g., an additional 10 days. Such a 10-day telephone call delay could ramify on all follow-up telephone contacts which become pending for a particular period after salesperson A's vacation, e.g., for 30 days subsequent to salesperson A's return.

Accordingly, under the teachings of the present invention, to accommodate the diversity of situations that occur in a conventional business applications and the like, a strategy based system should afford the capability to manipulate a subset of pending actions, i.e., selected actions stored in a Pending database, wherein certain critical or priority actions will be timely effectuated, but other less critical actions may be rescheduled or otherwise adjusted to be delayed according to acceptable criteria defined in a knowledge base.

Figure 20:
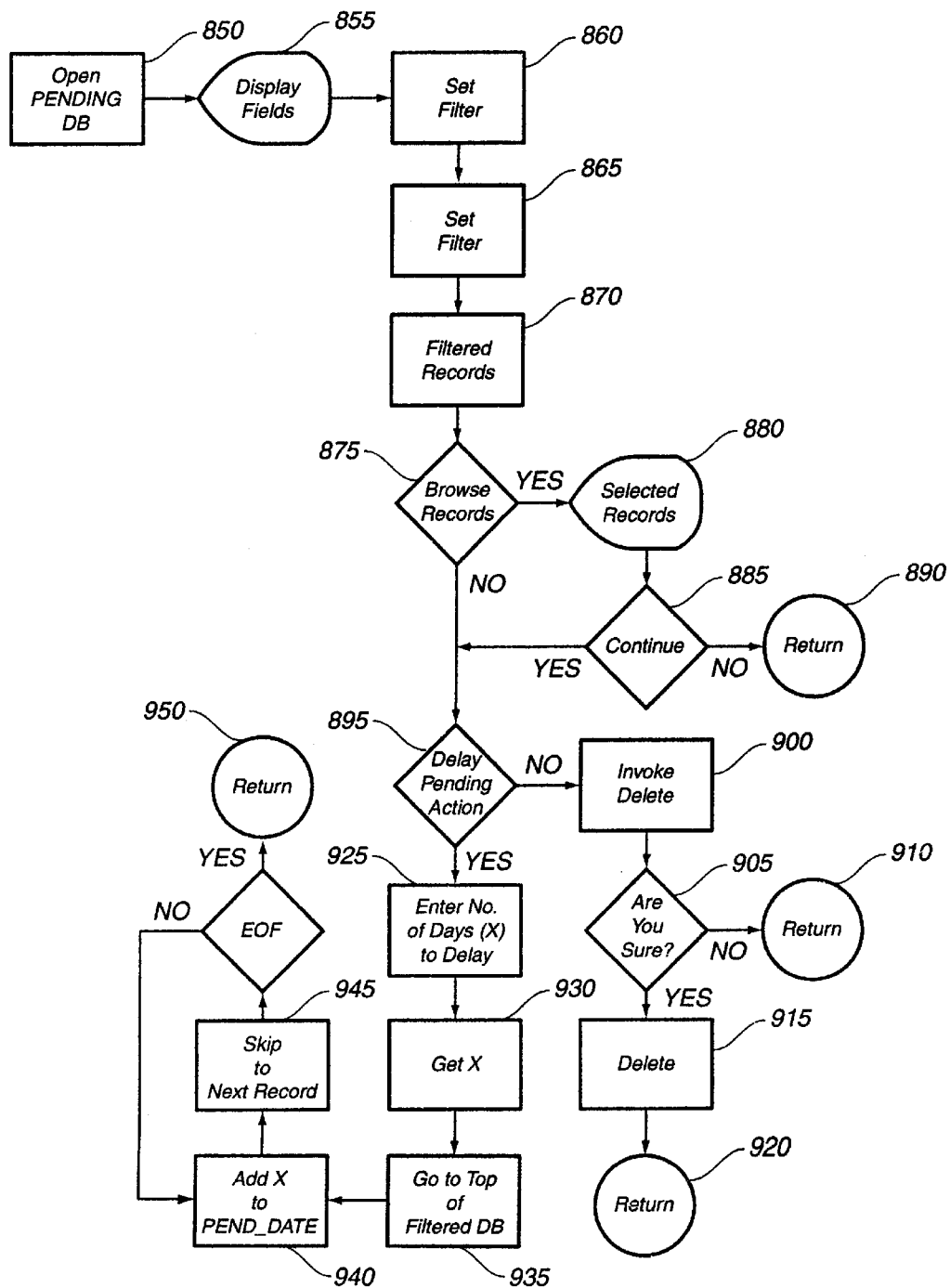
FIG. 20 depicts a flowchart of the Delay Pending aspect of the preferred embodiment.

Referring now to FIG. 20, there is depicted a flow diagram of the preferred embodiment of the Delay Pending function taught by the present. In the initial step represented by numeral 850, the Pending database is opened. Next, in step 855, the pending action fields are displayed preparatory for the Delay Pending computer programmed module of the preferred embodiment applying appropriate filters to select records satisfying the specified filtration criteria In step 860, the data filtering condition is set so that only qualifying records are retrieved within the Pending database. In a manner well known in the art, a suitable query is created using a Query Builder module for specified conditions related to one or more fields. As should be evident to those skilled in the art, the Query Builder provides conventional logical conditions selected from equal to (=), less than (<), greater than (>), less than or equal to (<=), greater than or equal to (>=) or not equal to (<>) which operate on a particular field. For example, a query for filtering out the Pending actions to be performed upon every entity having the title "president" would be defined as "Title='President'." Once the appropriate filter is established in step 860, the filter is actually invoked and activated in step 865, with the filtered records passed to the Delay Pending computer program module in step 870. In step 875, the user has the option to view the selected records. As will be appreciated by those skilled in the art, step 875 affords the user an opportunity to validate that the selection criteria was correctly defined, wherein the corresponding intended records were isolated in the filter invoked in step 870. Step 880 provides a logic test whether to continue with Delay Pending processing in step 895 or to return in step 890 because of incorrect filtration of records in the Pending database.

Thus, in step 895 the Delay Pending module ascertains whether the record should be deleted or delayed. If the record should be deleted from the Pending database, then step 900 invokes the delete function which is confirmed in step 905. If, indeed, the user intends to delete the pending isolated record and so indicates, then step 915 actually performs the record deletion and returns via step 920. If the user is not sure whether the selected Pending records should be deleted, then deletion is skipped and the Delay Pending returns control via step 910. If, on the other hand, the selected pending actions should be delayed, then step 925 receives from the user the number of days to delay these pending actions and step 930 loads X into internal fields for application to the filtered subset of pending action records. Step 935 positions at the top of the filtered datebase, and then in steps 940 and 945 the scheduled dates (PEND_DATE in preferred embodiment) for each of the selected pending actions are incremented by X days. Control is returned in step 950 when an end-of-file conditions is reached. Generally, of course, it should be understood that the pending number of days "X" may be a negative value, wherein the subset of filtered pending actions are actually advanced in time. Depending upon the circumstances in a particular business environment, such advancement of pending actions may be more advantageous than delaying such actions.

A computerized strategy based system as contemplated by the present invention should preferably provide a mechanism for regularly performing queries against a knowledge base, wherein appropriate actions may be located and designated as being pending. Thus, according to the teachings of the present invention, referring to FIG. 21, queries are automatically made against the Names database based upon priority and event criteria. Once these pending actions are processed, the Update Fields feature is preferably invoked as appropriate to modify all records found meeting the selection criteria. As will be appreciated by those skilled in the art, for all of these records found as a result of query against the knowledge base, corresponding actions are added to the Pending database.

According to methodology well known in the art, appropriate decision rules may be defined for making such knowledge base queries. For instance, the Names database could store not only demographic data, but also could store status information, number of contacts, last purchased items and related sales information, credit worthiness, etc. Specific product and event interrelationships could be captured via decision rules, algorithms and the like. As an example, a customer who purchased a widget six months ago may be an excellent prospect to purchase a super-widget during a current sales promotion. As another example, any priority customer should be contacted either by telephone or in-person within a 30-day period, regarding cross-sales opportunities.

Under the present invention, the Expert function performs necessary queries based upon predefined criteria and decision rules. More particularly, all such named queries are added to Expert table 95 (see FIG. 2) having the record layout shown in FIG. 21, indicating the selection criteria in 250-character field CONDITION. For example, to find all priority customers who should be contacted within a 30-day period, an entry in field CONDITION in the EXPERT table would be in the form:

CREDIT_WORTH.AND.LASTCONTACT>(DATE( )-30)    (1)

Thus, for all credit-worthy customers, an appropriate date range would be ascertained based upon date of last contact and 30 days therefrom. All actions involving contacting customers would involve updating Names field LASTCONTACT and would typically include computer operating parameters like the system date. It is an important feature and advantage of the present invention that, for all Names records which satisfy a particular query, the Expert adds suitable actions to the Pending database with a PEND_DATE corresponding to the current date as stored in the system date parameter for the host computer system.

As will be appreciated by those skilled in the art, such a newly designated pending action, i.e., an action designated by the Expert feature as being pending, is processed contemporaneously with other actions having a pending date less than or equal to the system date. It is an important feature of the present invention, that, to properly emulate real world business environments and the like, the Expert will not add any actions to the Pending database that have already been effectuated or, if appropriate, if the actions have already occurred in a certain number of previous days, because the query may still be satisfied for a certain number of successive days.

The Expert processing contemplated under the present invention is depicted in the flowchart in FIGS. 26A–C. First referring to FIG. 26A, in the step represented by numeral 2000, the Expert database is opened. In step 2005, if this database is empty, then control is returned to the calling computer program module in step 2010; otherwise, further processing commences at the beginning of the Expert database in step 2015. Then, in step 2020, for each Expert record, data fields (see FIG. 21) are stored in suitable location in memory in step 2025. Thus, the action# stored in field DOTHIS is loaded into memory location A; the number of days stored in field HOWOFTEN is stored into memory location B; the description of the decision stored in field WHATITIS is loaded into memory location C; and the filter stored in field CONDITION is loaded into memory location D. In step 2040, the Names database is opened and positioned at the beginning thereof in step 2045 (see FIG. 26B). Then, referring to FIG. 26B, the contents of its record number and employee data fields (see FIG. 8) are loaded into memory locations represented by x and y in step 2050. Then, in steps 2055 and 2060, it is ascertained whether the current Names record meets the condition. If the current record is filtered out by not passing the specified condition, then another Names record is obtained and logic continues in step 2055. If the condition is met, then in step 2065, the History database is opened and a search is conducted for a record with Names record #=x and action #=A and action date<current date−B. If a matching record is found in step 2075, the next Names record is obtained in step 2080 and logic continues in step 2060.

Referring to FIG. 26C, in step 2085, if a record matching the condition in step 2070 is not found, then the Pending database is opened in step 2085 and a blank record is appended thereto in step 2090. Then, the Actions database is opened in step 2095 and a record is sought with action #=A in step 2100. For the record found, an action is established corresponding to the employee contained in the particular Names record: the current date is stored in action date field and action number is stored in action # field, employee y is stored in employee field, etc. Processing then skips to step 2110 to proceed with the next Expert database record.

Another important aspect of the present invention is the ability to reassign named entities and/or pending actions from one employee to one or more other employees. In any business environment and the like situations will frequently arise wherein tasks must be reassigned either because employees resign or are transferred and promoted. Similarly, situations will arise in which a customer is reassigned either because of the customer's needs or because of particular employees' capabilities, or perhaps both. In addition, certain business related events may be reassigned and the like because of reorganizations, mergers, etc.

For a business employing sales people, the possibility exists that responsibility for looking after an account may change: sales people leave the company, territories are changed and the like. Within a strategy based system, it may not be enough to merely change the primary responsibility for a customer account—it may also be necessary for any and all pending actions either presently assigned or scheduled to be assigned in the future to be reassigned as well.

As should be clear to those skilled in the art, a one-to-many relationship exists between the Names and Pending actions databases. This is because one named entity may have several pending actions associated with it. However, a pending action attached to a Names record may actually correspond to an employee other than the employee having primary responsibility for the named entity. Such a one-to-many relationship between a single Names record (Mr. John Jones) and multiple Pending records (users A and B) is illustrated in FIG. 24.

It is clearly seen that two pending actions are scheduled for Names record number "n", yet the scheduled actions are to be performed by employees other than employee C, who has primary responsibility for Mr. John Jones, the entity represented by Names record n. In particular, Pending record "x" corresponds to an action to be performed by employee A upon John Jones. Similarly, Pending record "y" corresponds to an action to be performed by employee B upon John Jones. Under the present invention, if circumstances change wherein employee A leaves the company, to properly emulate the business scenario, it will be prerequisite not only to change in the Names database all those records showing employee A as having primary responsibility, but also to change records in the Pending database for all actions that were or are or will be due to be performed by or perhaps on behalf of employee A. Under the teachings of the present invention, the determination of which of these Names records have changed assigned employee should preferably be made by authorized users of a smart system and will be in response to a diversity of business circumstances which demand reassignment. Unlike art heretofore known, the present invention supports this vital requirement to make such alterations so that real world business and organizational environments may be accurately and continuously emulated.

As will also be understood by those skilled in the art, in order for a Reassignment feature to be practicable, allowance should preferably be made for each of the following eventualities: (1) reassign Names records only; (2) reassign Pending actions only or a subset thereof; and (3) reassign both Names records or a subset thereof, and Pending actions or a subset thereof. It should also be appreciated that it is necessary that a smart system afford the capability to perform each of the above eventualities to a subset of the Names database only. For example, it may be appropriate to transfer the primary responsibility for certain Names records in a particular state, e.g., Texas, to a different employee under circumstances in which the Names database is populated with records from many different states. Alternatively, it may be required to transfer only the pending actions for records in Texas to another person, thus not affecting the primary responsibility, per se.

As should be evident to those skilled in the art, these various reassignment functions are essential to a strategy based system if a business environment and the like is to be effectively emulated over a period of time. Indeed, without these or similar reassignment features, a computer system would not be of practical use in a business environment: such a system would be unable to respond and allow for changing responsibility within an organization, whether the change were temporary or permanent.

The preferred embodiment of the present invention provides such a reassignment aspect as an option while processing employee information. Just prior to the reassignment feature being invoked, the user specifies whether the modified reassignment will apply only to the Names database or will apply only to actions scheduled in the Pending database. Next, as will be appreciated by those skilled in the art, a query is defined to accomplish the intended reassignment In a manner well known in the art, dialog boxes, pull-down menus, etc., may be used to allow users to conveniently incorporate field names and values into the specified selection criteria. It may be advantageous for users to establish a plurality of predefined queries to perform expectable reassignments; using this approach, only the new employee would have to be identified, and then the appropriate predefined query would be invoked to select the records either in the Names or Pending database, or both, for the reassignment to be effectuated.

Still another aspect of the preferred embodiment of the present invention is its ability to quickly diagnose the incidence of duplicate records. Duplicate records are found preferably by comparing the concatenation of the last four digits of the phone number and the five-digit zip code.

As will be evident to those skilled in the art, the present invention is particularly advantageous for operating business environments and the like wherein computer networks are implemented. Consider, as an example, a bank having several hundred branches. Processing of all branches could be orchestrated from a headquarters location or, indeed, could be orchestrated from one of the branch locations. As has been hereinbefore described, the present invention provides a security mechanism whereby system access requires adequate authority and sufficient database "rights" in order to enable global processing. There may also be limitations of particular users to intuitive or procedural operations of a smart system. Thus, if a user has limited security and field-rights (browse or read only), which, of course, is confirmed when a user logs on to such a networked smart system, available records in a multi-branch database of pending actions would be limited to only the particular user's pending actions. Using search and indexing techniques well known in the art, under these limited access circumstances, the multi-branch pending database would be traversed to isolate only the records for the logged-on user. Any subsequent processing instigated by the user would then be limited to this subset of pending records and related records throughout the knowledge base.

It should be apparent to those skilled in the art that the present invention teaches a smart system capable of continuously operating virtually all business and organizational environments for which a plurality of strategies have been defined. It should be clear that the maximum utilization of a smart system contemplated by the present invention depends from users defining all possibilities in the business strategies stored in its novel knowledge base. As has been described in detail, under circumstances in which strategies comprehensively define a particular real world environment, the present invention effectively emulates its ongoing operation, wherein actions may be automatically scheduled and completed actions automatically set up consequent and ensuing actions, thereby minimizing human intervention and human error.

Other variations and modifications will, of course, become apparent from a consideration of the structures and techniques hereinbefore described and depicted. Accordingly, it should be clearly understood that the present invention is not intended to be limited by the particular features and structures hereinbefore described and depicted in the accompanying drawings, but that the present invention is to be measured by the scope of the appended claims herein.

What is claimed is:

1. An adaptable user-defined strategy-based computerized system for emulating the continuous operation of a business scenario, said smart computer system comprising:
   a relational knowledge base means for storing a plurality of strategies pertaining to said business scenario, said knowledge base including:
      names database means for storing a plurality of entities characterizing said business scenario;
      actions database means for storing a plurality of recurring activities and events characterizing said business scenario, and relating said plurality of entities;

employee database means for storing a plurality of employees who perform said plurality of recurring activities and events upon said plurality of entities, said employee database means related to said names database means and said actions database means;

pending database means for storing at least one sequence of select activities and events of said plurality of activities and events scheduled to be performed by corresponding select employees of said plurality of employees upon at least one select entity of said plurality of entities; and history database means for storing said select activities and events stored in said pending database means, when each of said activities and events of at least one sequence of said select activities and events stored in said pending database means is completed;

input means for providing menus and screen dialogs for user specification of the contents of said knowledge base;

means for ascertaining which of said plurality of activities and events scheduled to be performed by said plurality of employees upon said plurality of entities stored in said pending database means should be processed concomitantly with appropriate related databases in said knowledge base, to emulate the operation of said business scenario over a user specified time period;

processing means for performing said processing of said pending database concomitantly with said appropriate related databases in said knowledge base over said user specified time period, and for maintaining synchronicity between completed actions contained in said pending database means and said history database means;

query means for accessing said knowledge base; and output means for receiving results from said processing means and for providing said results to said plurality of employees.

2. The computerized system recited in claim 1, wherein said relational knowledge base means further comprises update fields database means for automatic editing of records stored in said knowledge base means.

3. The computerized system recited in claim 2, wherein said update fields database means is configured to receive a plurality of fields with their concomitant data type and value, for automatic editing of said plurality of fields immediately after one of said plurality of activities and events contained in said pending database means is processed by said processing means.

4. The computerized system recited in claim 1, wherein said processing means includes employee reassignment means for dynamically replacing a plurality of employees from said employee database means assigned to perform a scheduled action upon a plurality of entities from said names database means contained in said pending database means with another plurality of employees from said employee database means.

5. The computerized system recited in claim 1, wherein said names database means includes parent-child means for interrelating a plurality of entities contained therein responsive to a variable number of user-defined interdependencies between said plurality of entities and a plurality of employees from said employees database means.

6. The computerized system recited in claim 1, wherein said processing means maintains said synchronicity between said pending database and history database means by simultaneously deleting a scheduled action from said pending database means and creating a corresponding completed action in said history database means.

7. The computerized system recited in claim 6, wherein said processing means includes a telephone processing means for only deleting a telephone-related action from said pending database means when said telephone-related action is completed.

8. The computerized system recited in claim 1, wherein said processing means includes a delay pending means for selecting a plurality of said pending activities and events stored in said pending database means based upon user-defined selection criteria and then modifying the scheduled completion dates thereof based upon a user-defined date criterion, responsive to changes in said business scenario.

9. The computerized system recited in claim 1, wherein said actions database means includes entry point means for limiting selection of subsequent activities and events to a predefined subset of activities and events depending from an initial activity or event.

10. The computerized system recited in claim 1, wherein said actions database means includes options from means for limiting selection of subsequent activities and events to a predefined subset of activities and events depending from a preceding activity or event.

11. The computerized system recited in claim 1, wherein said actions database means includes replacement means for deleting a plurality of subsequent activities and events contained in said pending database means based upon said plurality of subsequent activities and events being predefined in a preceding activity or event, and said deletion of said plurality of subsequent activities and events occurring during said operation of said processing means.

12. The computerized system recited in claim 1, wherein said means for ascertaining which of said plurality of scheduled activities and events contained in said pending database means should be processed further comprises expert means for conducting said ascertaining based upon user-defined rules involving an interrelated plurality of entities, employees, activities and events contained in said knowledge base.

* * * * *